(12) United States Patent
Zimmerman et al.

(10) Patent No.: US 10,377,651 B2
(45) Date of Patent: Aug. 13, 2019

(54) BUBBLE GENERATION FOR AERATION AND OTHER PURPOSES

(71) Applicant: Perlemax Ltd, Sheffield (GB)

(72) Inventors: William Bauer Jay Zimmerman, Sheffield (GB); Vaclav Tesar, Jinzi Mesto (CZ)

(73) Assignee: PERLEMAX LTD, Sheffield (GB)

( * ) Notice: Subject to any disclaimer, the term of this patent is extended or adjusted under 35 U.S.C. 154(b) by 1128 days.

(21) Appl. No.: 13/652,004

(22) Filed: Oct. 15, 2012

(65) Prior Publication Data
US 2013/0092626 A1    Apr. 18, 2013

Related U.S. Application Data

(63) Continuation-in-part of application No. 12/447,629, filed as application No. PCT/GB2007/004101 on Oct. 29, 2007, now Pat. No. 8,287,175.

(30) Foreign Application Priority Data

Oct. 30, 2006   (GB) .................................. 0621561.0

(51) Int. Cl.
C02F 3/00    (2006.01)
C02F 3/28    (2006.01)
(Continued)

(52) U.S. Cl.
CPC ........ C02F 3/2866 (2013.01); B01F 3/04248 (2013.01); B01F 3/04517 (2013.01);
(Continued)

(58) Field of Classification Search
CPC ........ C02F 1/66; C02F 3/2873; C02F 3/2866; C02F 3/223; C02F 3/1215;
(Continued)

(56) References Cited

U.S. PATENT DOCUMENTS 4,167,873 A     9/1979  Bahrton
4,793,714 A  *  12/1988  Gruber ................ B01F 3/04978
                                                    261/122.1
(Continued)

FOREIGN PATENT DOCUMENTS

AU    2007315935 A1   5/2008
DE       3543022 C1   8/1987
(Continued)

OTHER PUBLICATIONS

International Search Report of corresponding PCT/GB2007/004101 application.
(Continued)

Primary Examiner — Anshu Bhatia
(74) Attorney, Agent, or Firm — Alston & Bird LLP

(57) ABSTRACT

Uses of a method of producing small bubbles of gas in a liquid include gas transfer in airlift bioreactors and anaerobic digesters, and particle separation. The method uses a source of the gas under pressure, a conduit opening into a liquid and oscillating the gas passing along the conduit. The oscillation is effected by fluidic oscillator, comprising a diverter that divides the supply into respect outputs, each output being controlled by a control port, wherein the control ports are interconnected by a closed loop. Separation of algae from water involves delivering a laminar flow of microbubbles in the range 10 to 100 μm diameter. Such bubbles also deliver a laminar flow in bioreactors that delivers enhanced liquid flow despite the small bubbles, which improves mixing and also enhances efficiency of gas exchange and retention of the bubbles in the reactor.

11 Claims, 24 Drawing Sheets

(51) Int. Cl.
*B01F 15/02* (2006.01)
*B01F 3/04* (2006.01)
*C02F 3/22* (2006.01)
*B03D 1/24* (2006.01)
*C02F 3/12* (2006.01)

(52) U.S. Cl.
CPC ........ *B01F 3/04978* (2013.01); *B01F 15/024* (2013.01); *B03D 1/242* (2013.01); *C02F 3/223* (2013.01); *C02F 3/2873* (2013.01); *B01F 2215/0431* (2013.01); *B01F 2215/0459* (2013.01); *C02F 3/1215* (2013.01); *C02F 2301/022* (2013.01); *C02F 2303/26* (2013.01); *Y02E 50/343* (2013.01); *Y02W 10/12* (2015.05); *Y02W 10/15* (2015.05); *Y02W 10/37* (2015.05)

(58) Field of Classification Search
CPC ............ C02F 2301/022; C02F 2303/26; B01F 3/04248; B01F 3/04517; B01F 3/04978; B01F 15/024; B01F 2215/0431; B01F 2215/0459; B03D 1/242; Y02W 10/12; Y02W 10/15; Y02W 10/37; Y02E 50/343
See application file for complete search history.

(56) References Cited

U.S. PATENT DOCUMENTS

| | | | |
|---|---|---|---|
| 5,190,099 | A | 3/1993 | Mon |
| 5,524,660 | A | 6/1996 | Dugan |
| 5,674,433 | A | 10/1997 | Semmens et al. |
| 5,893,383 | A | 4/1999 | Facteau |
| 6,326,203 | B1 * | 12/2001 | Worden ............... C12M 23/06 210/635 |
| 6,572,084 | B1 * | 6/2003 | Ivanovich ........... B01F 3/04446 261/122.1 |
| 6,805,164 | B2 | 10/2004 | Stouffer |
| 7,128,082 | B1 | 10/2006 | Cerretelli et al. |
| 7,600,741 | B2 * | 10/2009 | Lipert ................. C02F 3/2873 261/123 |

FOREIGN PATENT DOCUMENTS

| | | |
|---|---|---|
| DE | 4405961 A1 | 8/1995 |
| DE | 19530625 A1 | 2/1997 |
| EP | 0135822 A | 4/1985 |
| EP | 0251627 A1 | 1/1988 |
| EP | 0376008 A | 7/1990 |
| EP | 1092541 A2 | 4/2001 |
| GB | 1281630 A | 7/1972 |
| GB | 2273700 A | 6/1994 |
| GB | 2443396 A | 5/2008 |
| JP | 60156536 A | 8/1985 |
| JP | 62277133 A | 12/1987 |
| JP | 63028432 A | 2/1988 |
| JP | 2002126482 A | 5/2002 |
| JP | 2003/265939 A | 9/2003 |
| JP | 2006087984 | 4/2006 |
| JP | 2008036502 | 2/2008 |
| JP | 2009535112 A | 10/2009 |
| SU | 1057436 A | 11/1983 |
| SU | 333653 A1 | 8/1987 |
| SU | 1616561 A1 | 12/1990 |
| WO | WO 1999/030812 A1 | 6/1999 |
| WO | WO 1999/031019 A1 | 6/1999 |
| WO | WO2007/127596 A1 | 11/2007 |

OTHER PUBLICATIONS

Australian Office Action dated Aug. 15, 2011, for Application No. 2007315935.
European Office Action dated Feb. 9, 2010, for Application No. 07824345.8.
Japan Office Action dated Apr. 15, 2011, for Application No. 2009-535112.
Japan Patent Office Search Report dated Mar. 30, 2012, for Application No. 2009535112.
United Kingdom Examination Report dated Jul. 26, 2010, for Application No. GB0621561.0.
United Kingdom Examination Report dated Jun. 15, 2011, for Application No. GB0621561.0.
United Kingdom Examination Report dated Aug. 9, 2011, for Application No. GB0621561.0.
United Kingdom Search Report on Claims 1-9, 30-36 and 39 dated Feb. 21, 2007, for Application No. GB0621561.0.
United Kingdom Search Report on Claims 10-22, 37 and 39 dated May 17, 2007, for Application No. GB0621561.0.
United Kingdom Search Report on Claims 38 and 39 dated May 17, 2007, for Application No. GB0621561.0.
United Kingdom Search Report on Claims 23-29 and 39 dated May 17, 2007, for Application No. GB0621561.0.
International Preliminary Report on Patentability, dated May 5, 2009, of corresponding PCT/GB2007/004101 application.

* cited by examiner

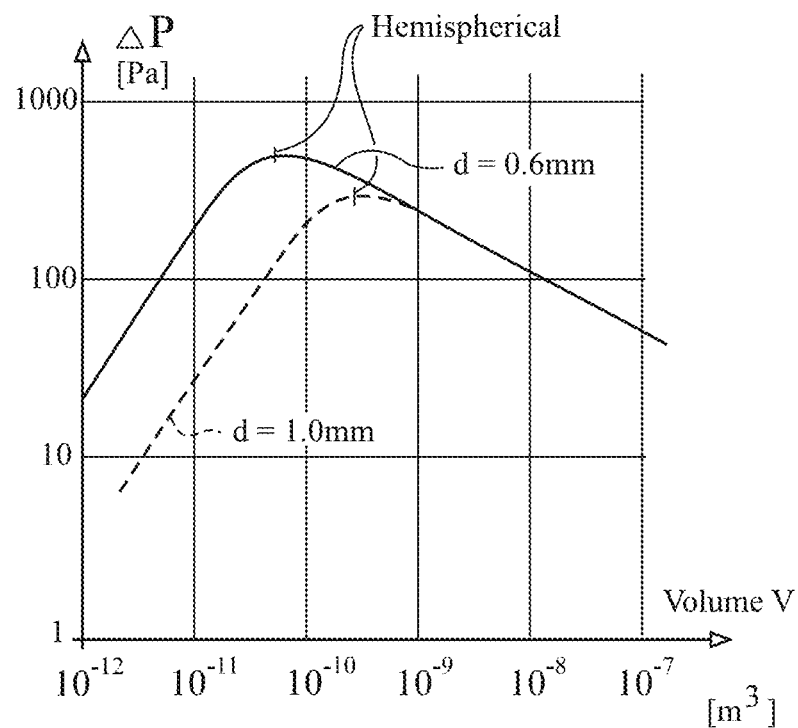
Fig. 3
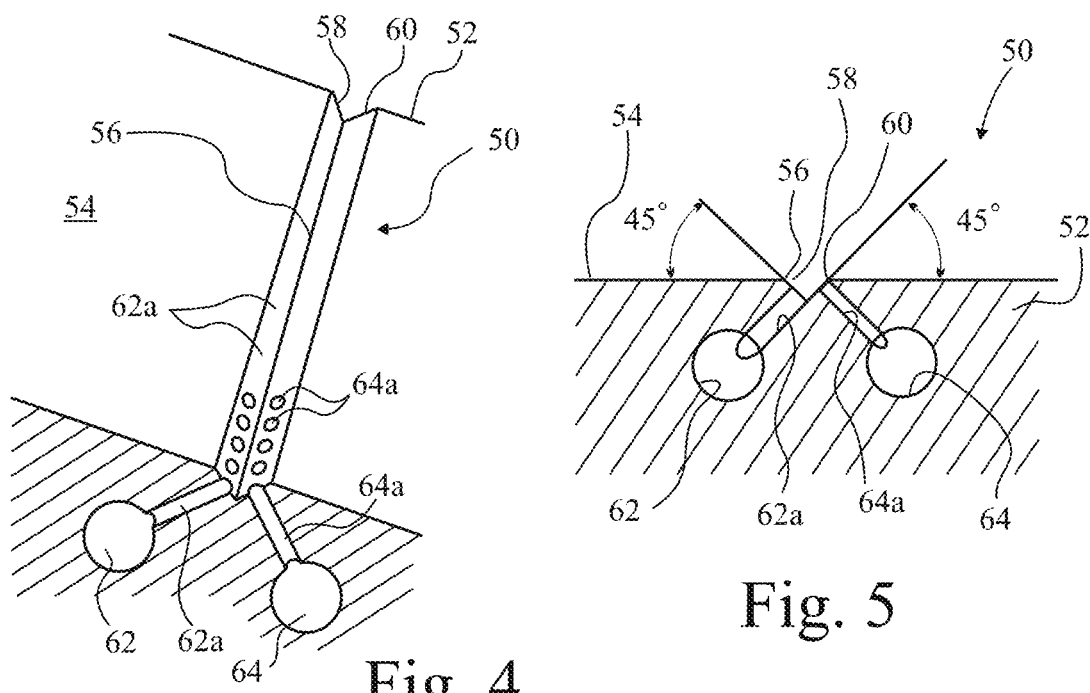
Fig. 4
Fig. 5

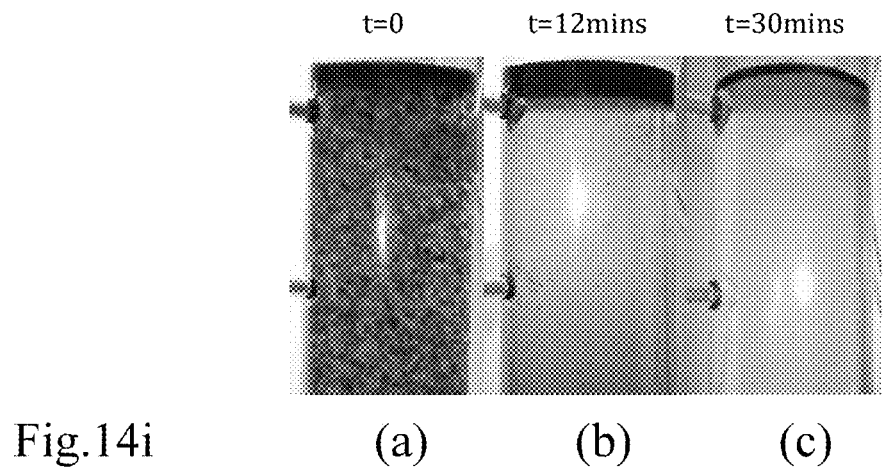
Fig.14i     (a)     (b)     (c)
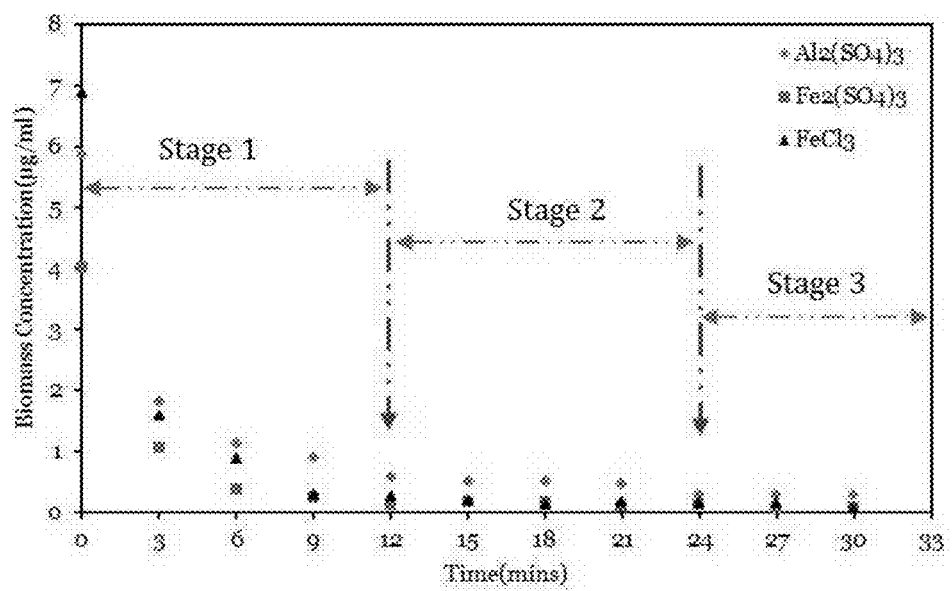
Fig.14ii

BUBBLE GENERATION FOR AERATION AND OTHER PURPOSES

CROSS-REFERENCE TO RELATED APPLICATIONS

This application claims priority to and is a continuation-in-part of co-pending U.S. patent application Ser. No. 12/447,629, filed Apr. 28, 2009, entitled, "Bubble Generation For Aeration And Other Purposes," which is a national stage application, filed under 35 U.S.C. § 371, of International Application Number PCT/GB2007/004101, filed Oct. 29, 2007, entitled, "Bubble Generation For Aeration And Other Purposes," which claims priority to Great Britain Patent Application No. 0621561.0, filed Oct. 30, 2006, entitled, "Bubble Generation For Aeration And Other Purposes," all of which are hereby incorporated by reference herein in their entirety.

BACKGROUND

This invention relates to the generation of fine bubbles and their application in two processes, one being airlift loop bioreactors and the other being particle, in particular, algal floc, separators.

Bubbles of gas in liquid are frequently required in many different applications and usually, but not exclusively, for the purpose of dissolving the gas in the liquid. Like any industrial process, it is generally desired that this be done in the most efficient manner possible. It is widely recognised that one way to achieve efficiency is to reduce the size of the bubbles. The surface area to volume ratio of a smaller bubble is higher. Moreover, the surface tension of a small bubble means that the gas pressure inside the bubble is relatively much higher than in a large bubble. Also small bubbles rise more slowly than large bubbles and they coalesce less quickly so that larger bubbles, that rise to the surface faster, are less quickly formed.

Applications that do not involve gas dissolution exist in oil wells where bubbles rising can transport oil to the surface in certain types of well. Here small bubbles are also advantageous because it takes them longer to coalesce and form the big slugs of gas that are not effective in raising oil. The reason large slugs are not effective is because they have a small surface area compared with small bubbles and it is the surface of bubbles to which articles adhere. It has also been discovered that in the case of particles being lifted by bubbles there is a correlation between bubble size and particle size, in the sense that approximately equal sized bubbles and particles results in good collision efficiency and thus floc formation.

The corollary problem connected with fine bubbles, however, is that they are harder to produce. Reducing the size of the aperture through which the bubble is injected into the liquid is a first step, since it is difficult to form small bubbles through a large aperture. But, even so, a bubble may reach a large size by growing while attached even to a small gas-supplying aperture. Bubble separation is a dynamic process. In any event, such reduction in aperture size is not without cost, because the friction resisting flow of the gas through such a fine aperture, and through the passage leading to the aperture, means that a greater pressure drop is required. The bubble forms once the size of the bubble goes beyond hemispherical and necking-off of the bubble can occur. However, more energy needs to be applied at this stage to finally detach the bubble and generally this is simply achieved by pressing more gas into it increasing its size.

Indeed, generally, bubbles can be no smaller in diameter than the diameter of the aperture through which they are injected, and reducing the size of the bubble increases the energy needed to produce them so that a limit is reached beyond which the efficiency of the system is not improved any further. In fact, getting bubbles anywhere near the size of the aperture (i.e., less than double) would be a significant advancement.

A further problem is that, as bubbles grow beyond hemispherical, the pressure inside them drops. Consequently, two or more bubbles grown in parallel from a common source tend to be unstable beyond hemispherical. What occurs is that, beyond the hemispherical stage, one bubble grows rather more rapidly than an adjacent one (for any of a number of reasons, eg perhaps one is closer to the pressure source and so there is correspondingly less drag and greater pressure to drive the bubble formation). Once there is a size differential there is also a pressure differential with the greater pressure being in the smaller bubble. Consequently, since the bubbles are connected, the smaller bubble inflates the larger one at the expense of its own growth. The result is that, where multiple conduits are connected to a common pressure source, only a few of them end up producing overly large bubbles.

This instability of bubble formation may lead to one of the bubbles growing out of proportion to the aperture size. The necking-off and separation is a dynamic phenomenon and if the unstable bubble grows fast, it may reach a big size before it separates.

Another problem with uncontrolled bubble formation is that colliding bubbles frequently coalesce, so that the extra effort of forming small bubbles is immediately wasted. Ideally, monodisperse bubbles should be provided with sufficient gap between them to prevent coalescing. Indeed, the conditions that lead to coalescing may be dependent on a number of factors connected with a particular site and application, and that, desirably tuning of a bubble generation system should be possible so that the most efficient bubble generation can be arranged.

WO99/31019 and WO99/30812 both solve the problem of fine bubble generation using relatively large apertures by injecting the gas into a stream of the liquid being driven through a small aperture directly in front of the gas exit aperture. The stream of liquid draws the gas into a fine stream, much narrower than the exit aperture for the gas, and fine bubbles ultimately form beyond the small aperture. However, the physical arrangement is quite complex, although bubbles of 0.1 to 100 microns are said to be produced. Furthermore, although the gas exit aperture is large, the liquid into which the gas is injected is necessarily under pressure to drive it through the small aperture which therefore implies that the gas pressure is necessarily also higher, which must mitigate some of the advantage.

Numerous publications recognise that vibration can assist detachment of a bubble or, in the case of EP1092541, a liquid drop. That patent suggests oscillating one side of an annular discharge orifice. The production of liquid drops in a gas matrix can sometimes be regarded as a similar problem to the production of gas bubbles in a liquid matrix.

SU1616561 is concerned with aeration of a fish tank which comprises forcing air through a pipe where apertures open between flaps that vibrate under the influence of the gas motion and produce fine bubbles.

GB1281630 employs a similar arrangement, but also relies on the resonance of a cavity associated with a steel flap to increase frequency of oscillation of the flap and thereby further reduce the size of the bubbles.

U.S. Pat. No. 4,793,714 pressurises the far side of a perforated membrane through which the gas is forced into the liquid, the membrane being vibrated whereby smaller bubbles are produced.

U.S. Pat. No. 5,674,433 employs a different tack by stripping bubbles from hydrophobic hollow fibre membranes using volume flow of water over the fibres.

GB2273700 discloses an arrangement in which sonic vibrations are applied to the air in a sewage aeration device comprising a porous "organ pipe" arrangement, in which the pipe is vibrated sonically by the air flow. The invention relies on vibration of the aerator by virtue of the organ pipe arrangement, losing much of the energy input through inevitable damping by the surrounding water.

DE4405961 also vibrates the air in an aeration device for sewage treatment by mounting a motor driving the air pump on the aeration grid employed, and so that the grid vibrates with the natural vibration of the motor and smaller bubbles result. DE19530625 shows a similar arrangement, other than that the grid is oscillated by a reciprocating arrangement.

JP2003-265939 suggests ultrasonically vibrating the surface of a porous substrate through which a gas is passed into a liquid flowing over the surface.

From the above it is apparent that small bubble generation has application in the sewage treatment industry, in which it is desired to dissolve oxygen in the water being treated. This is to supply respiring bacteria that are digesting the sewage. The more oxygen they have, the more efficient the digestion process. However, a similar requirement exists in bioreactors and fermenters generally where they are sparged for aeration or other purposes. Specifically, the yeast manufacturing industry has this requirement, where growing and reproducing yeast bacteria need constant oxygen replenishment for respiration purposes. Another application is in the carbonisation of beverages, where it is desired to dissolve carbon dioxide into the beverage. A process not looking to dissolve the gas but nevertheless benefiting from small bubbles is in the extraction of hard-to-lift oil reserves in some fields which either have little oil left, or have the oil locked in sand. Indeed, much of the oil in Canada's oil reserves is in the form of oil sand. Bubbling gas up through such oil-bearing reserves has the effect of lifting the oil as the bubbles rise under gravity and bring the oil with them. The bubbles are formed in water and pumped into the well or reserve and the oil is carried at the interface between the gas and water of each bubble as it passes through the reserves. The smaller the bubble, the greater is the relative surface area for transport of the oil.

Another application of bubbles is in particle separation from a liquid suspension of the particles, of which an example application is algal separation. This might be desired for one or both of two reasons. A first reason is to clarify water contaminated with algae. A second reason is to harvest algae grown in water. The process is not limited to algal separation; any mixer comprising solid particles can comprise the use of bubbles which attach to suspended particles and carry them to the surface from which they may be scraped, either to recover the particles or clarify the water. However, attachment of the bubbles to the particles is problematic, particularly if the particles are charged when they may simply bounce off bubbles and not attach to them. Dissolved air flotation (DAF) is a known technique where air is dissolved under substantial pressure into water which, when released into the separation tank immediately releases large quantities of small bubbles. However, there are two issues. The first is the substantial energy requirements to compress and dissolve air in water. The second is the turbulence of the bubbles released into the tank.

It is an object of the present invention to improve upon the prior art arrangements. It is also an object to provide process applications using small bubbles.

BRIEF SUMMARY OF THE DISCLOSURE

In accordance with a first aspect of the present invention there is provided an airlift bioreactor comprising a liquid fermenter tank for microorganisms. The tank has sides and a base. The liquid in the tank has a top surface above which is a header space. The tank may be divided by a divider into a riser section and a downcomer section. The sections are interconnected at the top and bottom of each section. A diffuser of a microbubble generator is disposed at the base of the riser section and is arranged to inject bubbles of gas into the riser section, whereby the apparent density of the fluid in the riser section and downcomer zone is changed, causing a circulating flow of the fluid: up the riser section; over a divider at the top of the riser section; down the downcomer section: and back into the riser section under the bottom of the divider. Said flow, at least in the riser section, is non-turbulent laminar flow, having a Reynolds number less than 2000. Preferably, the Reynolds number is less than 200. In this connection, the Reynolds number is based on the liquid flow velocity, its constitutive properties and the pore diameter of the diffuser. Throughout this specification, including the claims, the term "airlift" should be understood to include "gaslift" where gas other than air is injected.

Indeed, while a physical divider is possible, comprising, for example, a draft tube in a cylindrical tank, a physical divider is not, in fact, absolutely necessary because the requisite circulation occurs naturally, when the flow is entirely laminar. The divider is simply the boundary separating the rising flow from the returning downcomer flow, which separate effectively from one another without turbulence or significant mixing in these conditions.

By arranging for laminar flow, which is achieved by taking into account a number of different factors including the density and viscosity of the liquid as well as the rate of injection and size of the bubbles introduced, the energy required for the gasification and circulation of the fermenter can be reduced to very low levels. A most important aspect is the size of the bubbles that must have such a slow terminal velocity in the liquid that, to all intents and purposes, they are stationary in the liquid and primarily generate movement of the liquid through the apparent density change of the liquid and which results in mass transport of the liquid including the bubbles. Absolutely stationary bubbles (with respect to the liquid) are of course impossible because of the density difference between the gas injected and the liquid which will always cause some movement, however small the bubble. However, because the frictional resistance of a rising bubble is proportional to its surface area, whereas the gravitational force causing it to rise is proportional to bubble volume, the smaller the bubble the slower its rise in any given liquid. In an aqueous environment, a bubble of less than 100 µm diameter rises sufficiently slowly not to create significant turbulence. Nevertheless, with sufficient number of such small bubbles per unit volume, the apparent density of the bubble-containing-liquid can be reduced to such an extent that the density difference can drive an entire column of liquid to rise, possibly at a much greater rate than the rise of the bubble with respect to the liquid. Indeed, the rate of injection of one bubble followed by a succeeding bubble can be close to the rate of rise of the liquid so that the injection itself generates little or no turbulence.

Depending on the particular fermentation taking place, preferably a proportion of the bubbles are carried over the divider into the downcomer section whereby gas transport across the bubble surface also takes place in the downcomer section.

This only occurs once the rate of fall of the liquid in the downcomer exceeds the rate of rise of the bubble in the liquid. Again this reduces wastage (of bubbles reaching the surface), if the object is the dissolve all the gas of the bubble in the liquid, which is frequently the case in fermenters. In aqueous fermenters, bubble size needs to be less than about 100 µm in diameter.

Conveniently, more than 90% of the bubbles having a size in the range 10 to 100 µm diameter (preferably 20 to 40) and a bubble density of at least 50 million per cubic meter, optionally at least 100 million.

Preferably, the gas holdup is less than 2%, optionally less than 1%. Holdup is the overall volume of gas in bubbles per unit volume of liquid.

In accordance with another aspect of the present invention there is provided a suspended particle separation tank, comprising: a floor having a floor area; liquid in the tank having suspended particles; and a diffuser of a microbubble generator, which diffuser is disposed at the base of the tank and is arranged to inject bubbles of gas into the tank to reduce the apparent density of the liquid above the diffuser, thereby creating a flow of the liquid and gas bubbles that is a non-turbulent laminar flow having a Reynolds number less than 2000, wherein more than 90% of the bubbles have a size in the range 10 to 100 µm diameter and a bubble density of at least 50 million per cubic meter, the Reynolds number being based on the liquid flow velocity, its constitutive properties and the pore diameter of the diffuser.

The Reynolds number may be less than 200. Optionally, more than 90% of the bubbles have a size in the range 20 to 50 µm diameter. The bubble density may be at least 100 million per cubic meter.

Preferably, the gas holdup is less than 2%, optionally less than 1%. The diffuser may be disposed across substantially the entire floor area of the tank. A specific example of a suspended particle separation tank is an algal separation tank.

The suspended particle separation tank may take the same form as the airlift bioreactor described above.

In this aspect, the invention also provides a method of particle separation comprising the steps of providing a separation tank as defined above comprising an aqueous mixture of suspended particles to be separated from the water, adding a flocculant to cause the particles to coagulate in flocs and adjusting the acidity of the mixture to a predetermined pH appropriate for the selected flocculant, and injecting bubbles into the tank, optionally across substantially the entire area of the floor of the tank, wherein more than 90% of the bubbles have a size in the range 10 to 100 µm diameter (preferably 20 to 40) and a bubble density of at least 50 million per cubic meter and wherein the flow created by the bubbles injected is a non-turbulent laminar flow having a Reynolds number less than 2000. Again, the Reynolds number is based on the liquid flow velocity, its constitutive properties and the pore diameter of the diffuser.

The foregoing separation technique has application also in the minerals sector and for oil water emulsions. It is also feasible to separate yeast or, indeed, any microorganism.

Preferably, the bubbles introduced create non-turbulent laminar flow having a Reynolds number less than 200. Preferably, the Reynolds number is less than 20. The benefit of a non-turbulent introduction of the bubbles is two-fold. Firstly, little energy is employed, so that the cost of the process is minimised, and secondly the flux rate of the bubbles is such that they gently approach flocs of coagulated material without disturbing them. Indeed, the problem of attachment is avoided because the particles (flocs) are much larger and so the bubbles can gently lift from underneath the floc rather than having to chemically attach and connect. This is not to suggest that chemical attachment does not occur, but rather that time is permitted for the attachment to occur through the gentle pressure caused by the constant, albeit small, force of gravity. The tendency of bubbles to bounce off or slip by particles is reduced.

The method is continued until a desired level of clarity of the water remains and at least until the sludge layer on the surface of the water comprising the particles separated from the water has thickened and thinned.

By "thickened and thinned" is meant that the solids density of the sludge layer has increased through compression from below by accumulated gas bubbles lifting the sludge against the surface and consequential squeezing out of water from the sludge layer, and whereby the thickness of the sludge layer reduces.

In some embodiments, certainly in the case of algal separation, the flocculant may be a metallic inorganic coagulant, such as iron or aluminium salts, added in solution. Coagulation is achieved with the coagulants dissociating into $Fe^{3+}$ and $Al^{3+}$ respectively as well as other soluble complexes having varying high positive charges. Essentially, the rate and extent to which these trivalent ions and other complexing species adsorb onto colloidal surfaces is pH dependent. At room temperature, under acidic pH, trivalent species-$Fe^{3+}$ and $Al^{3+}$. are the dominant species in the continuous phase. These predominant trivalent species are the most effective in colloidal charge neutralization and attach to the negatively charged algal cell. The excess $H^+$ present under low pH react with hydroxides of these metals to further release the trivalent metal species. As a consequence, more $Al^{3+}$ and $Fe^{3+}$ species become available again for charge neutralization, but the amount of hydroxide species is reduced. As pH shifts away from acidity however, $H^+$ concentration becomes less than $OH^-$ and the amount of trivalent ions present in solution reduces. These prevalent $OH^-$ react freely with the available trivalent metallic species to form the corresponding metallic hydroxide species. As such, hydroxide species become predominant under alkaline conditions attaching to algal cells and precipitating as large gelatinous flocs. Increased concentrations of hydroxide species for aluminium and ferric salts respectively has been reported as pH moves beyond pH 7 at room temperature. This explains the large flocs generated under alkaline condition. It is for these reasons the recovery efficiency is observed to increase again under alkaline pH. Consequently, either acidic or alkaline conditions may be selected to enhance the flocculant effect. (Note that flocculation and coagulation are used interchangeably for the same effect). Nevertheless, despite the above, acidic conditions are preferred. Despite large flocs being good vehicles for sweep flocculation, the overall efficiency under alkaline conditions for aluminium and ferric sulphate coagulants is lower than under acidic conditions.

This observation can be explained by the difference in charge density of species. The higher the size and charge of the species, the more effective the coagulation process will be. Because these charges increase with increasing acidity, recovery efficiency is highest under acidic pH. In addition, relatively larger flocs are developed under alkaline state and given that as particle size increases the residence time of the rising microbubble-floc agglomerate also increases leading to a prolonged flotation time. Moreover, the lifting force of microbubbles diminishes with increased particle size.

By contrast, the condition is quite different for $FeCl_3$ however. Whilst a similar tendency occurs under acidic condition, $FeCl_3$ exhibits a rather different behaviour under basic pH. It is note-worthy to reiterate that ferric chloride produced the overall best recovery result so far discovered. This is because ferric salts are relatively less soluble than aluminium salts. In addition, hydroxides of aluminium are amphoteric—containing both basic and acidic functional groups. Furthermore, the addition of ferric salts decreases the solution pH and the closer the pH tends towards acidity, the concentration of trivalent species in the solution increases. Thus the optimum pH for algal separation ranges from 5-7 for ferric chloride but for aluminium and ferric sulphate, two ranges are effective-5-6 and 8-9. Overall, the process governing these reactions is very complex and by no means easy to fully detail especially also as the growth medium itself may contain vital and very reactive chemical constituents.

Preferably, said separation tank is also a fermenter tank as defined above, comprising algae, which are grown through photosynthesis. The algae are harvested when required by introducing the flocculant into the acidity-regulated liquid so as to causes the algae to coagulate together in flocs which are lifted to the surface by the microbubbles. With a laminar flow of the fermenter liquid, the bubbles do not disrupt the flocs and effective clarification of the liquid can be achieved and the algae subsequently harvested by scraping from the surface.

Other kinds of fermenters are anaerobic digesters. An anaerobic digester is a processing unit in a wastewater treatment plant where organic matter is broken down via anaerobic bacteria in the absence of oxygen. The biodegradation of organic matter in an anaerobic digester takes place through four steps. The first step is an hydrolysis stage which converts the complex organic matter in to a simple state. The second step is the acidogenesis stage. In this stage, the product of the first stage converts into volatile fatty acids. Volatile fatty acids are converted into acetate in the third step by acetatogenic stage. Finally the acetate and carbon dioxide with hydrogen produced in second step convents into methane and carbon dioxide in the methanogenesis stage. Each stage is mediated by specific type of bacteria. Each bacteria requires a specific environment. Methanogenesic bacteria are more sensitive to change of operating conditions. However, there are general operating conditions, such as temperature, pH, Carbon-nitrogen ratio, and ammonia etc, appropriate for all the bacterial consortia.

The hydraulic retention time of a mesophilic anaerobic digester is approximately 20 days. Then the sludge discharges as effluent. The digested sludge (effluent) contains organic matters (biodegradable), anaerobic bacteria and some dissolved gases, for instance carbon dioxide and hydrogen sulphide. The presence of these dissolved gases has negative impact on piping and the downstream processing units. Corrosion is one potential problem in piping metals. In addition, the generation of biogas continuously in digested sludge during transfer creates a gas-liquid mixture. Even if a small phase fraction of gas, it degrades the performance of pumps due to cavitation phenomena.

Anaerobic digestion is an important source of methane in the search for green energy. It is UK Government policy to recycle 50% and recover energy from 25% of human waste by 2020. Anaerobic digestion breaks down food and plant waste to produce biogas, a mixture of methane and carbon dioxide which is burnt to produce electricity and a residual material which can be used as a soil improver.

Thus, in another aspect of the present invention there is provided an anaerobic digester comprising a liquid fermenter tank for anaerobic microorganisms and a diffuser of a microbubble generator to introduce bubbles of non-oxygen containing gas into the digester whereby methane and acid gases produced by the digestion are exchanged across the bubble surface to strip such gases from the liquid.

The anaerobic digester may take the same form as the airlift bioreactor described above.

In one embodiment, at a commencement phase of said digestion, said gas is nitrogen or another inert gas that merely strips the fermenter of oxygen to promote the onset of anaerobic digestion.

In another embodiment, during a growth phase of the microorganisms in the digester, said gas is or comprises the biogas generated and released into a head space of the fermenter tank. This typically comprises approximately 60% methane and 40% carbon dioxide. While reintroduction of bubbles of such gas into the fermenter does little to change the equilibrium of such gases in the liquid, it provides an escape route for the methane which in physical terms should be gaseous at room temperatures and the temperature of anaerobic digestion (typically 35° C.) it typically clings to particles such as the microorganisms themselves. Locally positioned bubbles permit methane to escape the liquid phase. Inside the bubbles, which thus grow in this environment, the balance of carbon dioxide remains so that it is also stripped from the liquid, along with acid gases.

Conventional anaerobic digestion does not need a nutrient gas. However, in yet another embodiment, during a growth phase of digester, said gas is or comprises carbon dioxide. Not only does this preferentially extract methane and hydrogen sulphide, but also provides "food" for the methanogenesic bacteria.

In another embodiment, at an endphase of said digestion, said gas is also is nitrogen or another inert gas that serves in this event to strip methane and hydrogen sulphide. Not only does this reduce the acidity of the remaining liquid but also it promotes further growth of the methanogenesic bacteria enhancing the methane output.

Thus, microbubbles introduced into the reactor increases methane yields, while at the same time 'sinking' waste $CO_2$.

Such a process has the possibility to increase or even double the amount of methane extracted through anaerobic digestion. Methane tends to adhere to the microorganisms and biomass in the reactor, rather than be released to the gas headspace. By using carbon dioxide microbubbles, it is found that, in addition to removing the methane already produced more effectively, the production rate of methane increases. The dissolved carbon dioxide is taken up as food by methanogenesic bacteria, thus increasing their production of methane. Microbubbles speed up gas exchange by providing more food to the bioculture, but also by removing the methane, which has an inhibitory effect on metabolism.

Preferably, the carbon dioxide is sourced from power production from the methane, or from sequestered carbon dioxide from other sources.

Also, fertilizer recovered from anaerobic digestion has hitherto been dried and trucked to farms, despite the fact that the digestate is about 90% water and would benefit from other transport mechanisms such as piping. This is necessary because the digestate is highly acidic and corrosive. By stripping out the acid gases, leaving the digestate substantially neutral, this barrier to transport via pumps and pipes is removed, improving the attraction of the anaerobic digestion process and the production of more environmentally sustainable electricity. It also supports sustainable agriculture by recovering the nutrients, particularly phosphates and potassium, which are not renewable without recycling.

This is better explained by reference to the reactions taking place. There are two competing reactions, the desirable methanogenesis reactions and the competing sulphide reduction reactions (see equations (10)-(13) below). From these equations, it can be seen that the sulphide-reduction reactions have greater thermodynamic driving force than methanogenesis, so that methane production is adversely impacted by sulphide concentration. Moreover of $H_2S$ has a negative impact on the methane production bacteria. The concentration of $H_2S$ can be taken as an indicator of inhibition of methanogenesic bacteria.

Thus removal of dissolved $H_2S$ from sludge prevents inhibition of methanogenesic bacteria and reduces odour from digested sludge. Normally, the removal of $CO_2$ and $H_2S$ take place through displacement of biogas generated ($CH_4$ and $CO_2$) or by contact with head space in the top of sludge. But this is insufficient to remove the dissolved gases. Mixing of the digested sludge provides intimate contact between sludge and bubbles of biogas or headspace.

Thus a method of operating an anaerobic digester as defined above comprises the steps of:
a) filling the tank with liquid comprising water and sludge, which sludge includes micro-organisms, organic matters, elements and suspended solids;
b) providing a head space above the liquid for the extraction of biogases evolving from the liquid;
c) rendering the tank anaerobic;
d) periodically, and on each occasion over a limited period of time, introducing bubbles of non-oxygen containing gas from the diffuser, at least a proportion of which bubbles have a size in the range 10 to 100 μm.

The flow generated by the bubbles may be non-turbulent laminar, having a Reynolds number less than 2000, the Reynolds number being based on the liquid flow velocity, its constitutive properties and the pore diameter of the diffuser. Sufficient bubbles must be introduced, of course, and sufficient proportion of them must be small enough (in the range 10 to 30 μm) to be retained in suspension to provide a site for microorganisms to attach and enable the transfer of methane from their surface into the bubble. There will be sufficient number of bubbles introduced, and sufficiently small, if the gas holdup of the bubbles in the tank one hour after at the end of the period provided in step d) is at least of 0.05%, preferably at least 0.5%.

During the digestion, step d) may be repeated daily and the period of time in step d) may be between 30 and 120 mins. the bubbles introduced in step d) may comprise carbon dioxide, indeed, more than 90% carbon dioxide, or essentially pure carbon dioxide. When the yield of biogas from the digester falls below a predetermined amount, step d) may be repeated a final occasion with said bubbles comprising substantially only nitrogen gas, whereby remaining methane, carbon dioxide and hydrogen sulphide is stripped from the digestate to neutralise the pH of the digestate. After this step, the digestate can be pumped from the tank and transported by pipeline to an irrigation array for land fertilisation. This is much less energy consuming than drying the digestate and transporting it by road.

While the anaerobic reactor has application in the digestion of waste, it also has application in yeast fermentation to (bio) ethanol and in anaerobic ammonium oxidation (anammox).

In accordance with another aspect of the present invention there is provided a method of producing small bubbles of gas in a liquid comprising the steps of:
providing a source of the gas under pressure;
providing a conduit comprising a diffuser opening into a liquid under pressure less than said gas, said gas being in said conduit; and
oscillating the gas passing along said conduit with a fluidic oscillator,
wherein the fluidic oscillator comprises a diverter supplied with the gas under constant pressure through a supply port that divides into respect output ports, and including means to oscillate flow from one output port to the other, and
whereby substantially monodisperse bubbles are provided in the liquid with sufficient gap between them to prevent coalescing.

Thus the entire energy of the system is in oscillating the gas, and not the conduit through which it is passed, whereby the efficiency of the system can be maximised. Energy is not wasted in oscillating the conduit that will have a much greater mass and consequently will require more energy to oscillate. Despite any resonance, friction still accounts for a proportion of the energy employed.

Sonic and ultrasonic vibrations, as suggested in GB2273700 and JP2003-265939 respectively, are high frequency and may not be as effective in generating bubbles. Although high energies can be imparted, the most effective detachment of bubbles is with longer stroke (higher amplitude) oscillations, rather than higher frequencies.

Preferably, said oscillations effected by the fluidic oscillator are effected at said frequency between 1 and 100 Hz, preferably between 5 and 50 Hz, more preferably between 10 and 30 Hz.

Preferably, the bubbles formed are between 0.1 μm and 100 μm in diameter, more preferably between 30 and 80 μm.

Preferably, said oscillation is of the type that has between 10% and than 30% backflow of gas from an emerging bubble. Indeed, said oscillation preferably is of the type that has between 10% and 20% backflow of gas from an emerging bubble. This is preferably provided by an arrangement in which a fluidic oscillator divides flow between two paths, at least one of said paths forming said source.

Backflow here means that, of a net gas flow rate from said conduit of x $m^3s^{-1}$, (x+y) $m^3s^{-1}$ is in the positive direction while (−y) $m^3s^{-1}$ is in the negative direction, $100(y/(y+x))$ being defined as the percentage backflow. Some backflow is largely inevitable, particularly with the arrangement where flow splits between paths, since there will always be some rebound. Indeed, such is also a tendency with bubble generation since, with the removal of pressure, back pressure inside the bubble will tend to cause some backflow. Indeed, backflow here means at the conduit opening, because backflow may vary by virtue of the compressibility of the gas.

Preferably, said means to oscillate flow from one output port to the other comprises each output port being controlled by respective control ports. Preferably, the control ports are interconnected by a closed control loop. Alternatively, a branch of each output port may supply each respective control port, whereby part of the flow in an output port becomes a control flow, switching the supply flow from that output port to the other output port.

When a control loop is employed, the control ports are arranged so that each has reduced pressure when the gas flows through its respective output, and increased pressure when there is no flow through its respective output. Consequently, when gas flows out of a control port, it detaches the main supply flow of the gas from the wall in which said control port is formed and switches that flow from the output port associated with that wall to the other output port, attaching the main flow from supply port to the wall associated with the other control port, and so the situation reverses with the main flow from the supply port oscillating between said output ports with a frequency determined by a number of factors including the length of the control loop.

Preferably, there are at least two of said conduits, each output port being connected to one or the other of said conduits.

The frequency of the oscillations may be adjusted by changing the length of said closed loop.

Preferably, the volumetric flow rate for each cycle of oscillation is sufficient to fill a bubble at the opening of each conduit to at least hemispherical size before the oscillation is switched, so that all the bubbles have substantially the same size before being separated from the conduit opening by the break in pressure.

Without wishing to be bound by any particular theory, it is believed that initial growth of a bubble from flat across the mouth of the conduit towards hemispherical accelerates and gives momentum to the liquid being displaced away from the mouth. Normally, as more gas is supplied, the bubble simply grows and the momentum of the retreating liquid continues, albeit decelerating, since the rate of growth of bubble radius is proportional to the cubed root of the volume of gas in the bubble. However, if the supply of gas to the bubble is cut off suddenly, a dynamic separation regime is observed whereby the bubble is "torn-off" the conduit. The bubble therefore forms at a much smaller size than would otherwise occur with a steady state fill pressure. Some backflow assists the necking of the bubble and the subsequent break-off of it.

Preferably, the conduit opens in the liquid at a surface of the material in which the conduit is formed, said surface being in a plane which is substantially vertical with respect to gravity. It is found that the tendency of the bubble to rise transversely with respect to the conduit by virtue of the disposition of the material surface surrounding the conduit serves to cause a pinching-off effect as the bubble rebounds at the end of each oscillation. Indeed, in one experiment, where the surface containing the conduit was horizontal, bubbles of diameter 500 microns in diameter were produced and yet, by turning the surface through 90 degrees with all other things being equal, bubbles of diameter one tenth of that were achieved.

In one arrangement, said conduit comprises a membrane having a slit which is closed, gas pressure behind the membrane serving to distend the slit to permit a bubble of gas to form through the slit, the slit closing behind the bubble, wherein the oscillation of the gas flow is synchronised in terms of pressure, flow rate, amplitude and frequency with the elastic properties of the membrane to encourage small bubble formation. In this respect, with a constant gas pressure, the mode of operation of such a membrane diffuser is oscillatory and consequently the oscillations of the gas can be synchronised so that, as the pressure behind the slit drops, sufficient gas has already exited the slit that the bubble cannot be squeezed back through the slit by its own surface tension before the slit closes.

In this respect, the material of the surface through which the conduit is formed is preferably non-wettable by the gas, so that the bubble does not tend to stick to it. Glass is a suitable material in this respect, although other materials such as Teflon® are also suitable.

The invention permits retro-fitting in existing installations that comprise a supply of gas under pressure and one or more bubble generators supplied by said supply and comprising a plurality of conduits opening into the liquid. In this event, the gas oscillator is interposed between the supply and bubble generator. Preferably, said bubble generator comprises a chamber connected to said gas supply and a porous wall of said chamber separating said chamber from the liquid and comprising said plurality of conduits. Said conduits may be apertures formed in said wall. The wall may be metal, for example sintered metal in which said conduits are pores in said metal. Alternatively, the wall may be a porous ceramic and the conduits being the pores of said ceramic.

Such methods of bubble production as described above may be employed in the fermenters and separators as defined above.

In connection with the algal separator, as well as in anaerobic and other digesters, such methods of bubble production as described herein are especially beneficial because of their low energy consumption. To introduce bubbles into a tank, the pressure of the gas supply need only be about half a bar higher than the hydrostatic pressure of the liquid at the point of introduction. In a typical tank with a three meter height of liquid, traditional DAF (dissolved air flotation) injects liquid saturated with gas at about 6 bar pressure into the ~1.3 bar clarifying tank. The turbulence caused by the liquid injection and release of the bubbles, despite their small size, is significant. The bubble production of the present invention injects at ~2 bar into the ~1.3 bar tank, and it is gas, not liquid, that is injected so there is no liquid turbulence. The present invention achieves the onset of the bubble creation with little more than the energy to create the bubble and the momentum needed to overcome the head of liquid above it. Consequently, each bubble can be injected at not much more than its terminal rise velocity.

While turbulent flow has been seen as beneficial with regard to attachment in flocculation processes (because it increases the collision rates of bubbles and generalized particles (droplets included)), the shear instability of turbulent flows also produces strong eddies that destroy flocs.

The present invention produces bubbles that rise in laminar flow. Moreover, at low gas flow rates, the gas phase holdup can be less than about 1%. Given that the traditional levels of gas phase holdup in dissolved air flotation is in the order of 10-12%, there is no comparison with the bubble flux; that is, there is much less kinetic energy/momentum injected with the present invention, so that, on the face of it, there is much less lift force as well. It is therefore unexpected that the present invention achieves comparable separation performance and rates to traditional DAF.

Without being bound to a particular hypothesis, one theory is that the flocs that form with a laminar flow of few small bubbles do not break up because of the lack of the turbulence destruction mechanism, and achieve comparable separation performance and rates. Additionally, because energy dissipation rates are typically proportional to the Reynolds number of the liquid flow, based on the diameter of the exit pore/nozzle, the present invention provides a Reynolds number in the range of 10-100, whereas conventional DAF has exit-nozzle Reynolds numbers of 10000-100000. It is therefore expected that the present invention dissipates ~1000-fold less energy. The capital cost of equipment, due to working at pressures less than 2 bar, is substantially less than working at pressures of 6 bar for DAF.

BRIEF DESCRIPTION OF THE DRAWINGS

Embodiments of the invention are further described hereinafter, by way of example, with reference to the accompanying drawings, in which:

FIG. 3 is a graph of bubble pressure against bubble volume for conduit openings of two different diameters;

FIG. 4 is a bubble generator plate of an alternative arrangement of the present invention;

FIG. 5 is an end view showing the relative dimensions of the liquid and gas conduits of the bubble plate shown in FIG. 4;

FIGS. 11 a and b are respectively side sections, (a) to (e), through an elastic membrane showing the development of a bubble, and a graph of differential gas/liquid pressure $\Delta P$ across the membrane at each of the stages of bubble formation shown in FIG. 11a;

FIGS. 14i a to c are photographs of the flotation unit of the set up of FIG. 12, showing the separation at three different key stages: (a) a few moments after flocculated algal cells were introduced into the unit; (b) after 12 minutes, clearly showing the algae sludge blanket minutes and where small flocs are predominant; and (c) a third stage after 30 minutes, marked by much slower separation as relatively smaller flocs but intense sludge thickening and thinning is observed;

FIGS. 14ii is a graph over the three stages referred to in FIG. 14i, of residual biomass concentration in the tank of the set up of FIG. 12, for three different coagulants (aluminium sulphate, ferric sulphate and ferric chloride);

DETAILED DESCRIPTION

Figure 1:
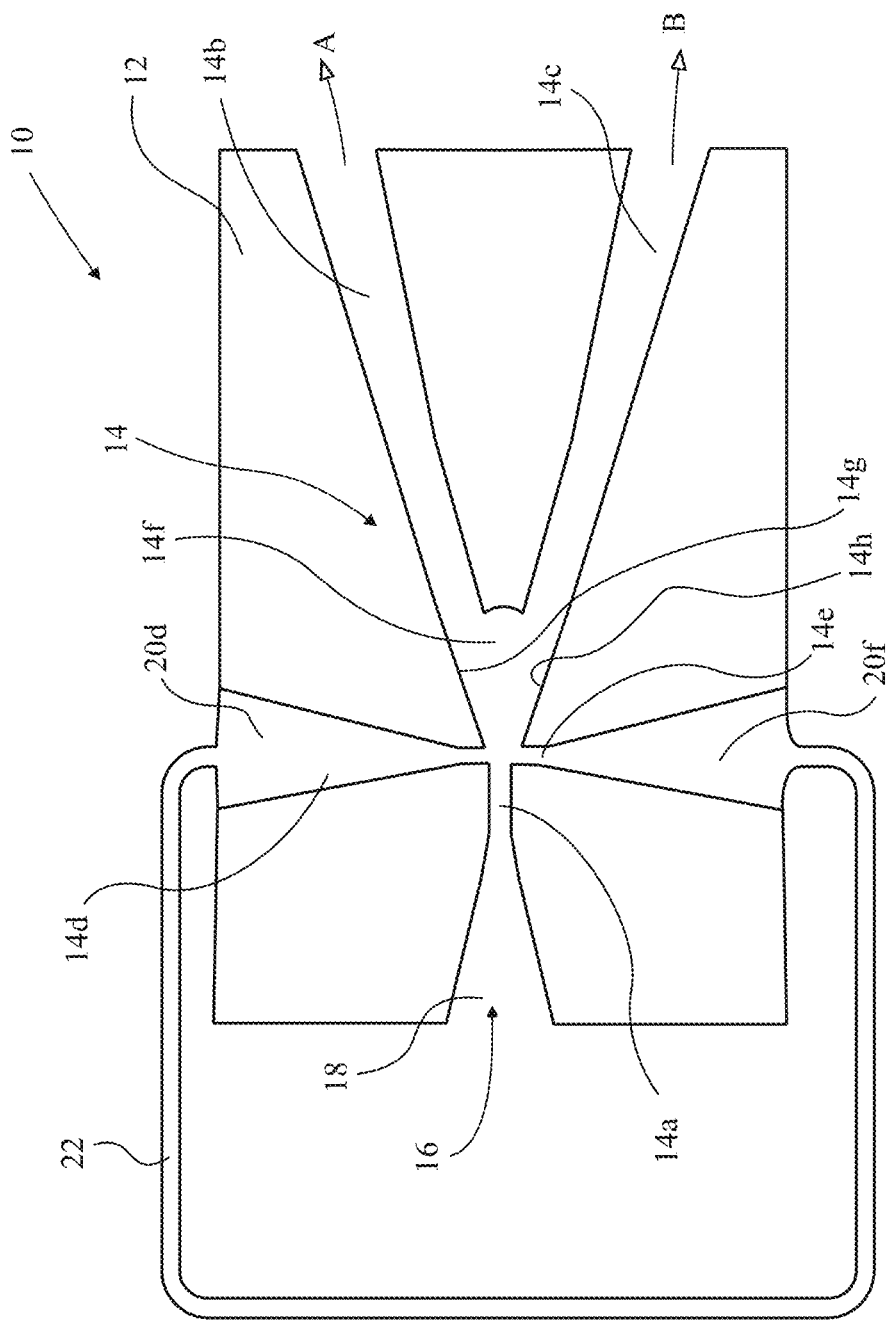
FIG. 1 is a plan view of a suitable diverter to oscillate gas in a method in accordance with the present invention.

In FIG. 1 a fluidic diverter 10 is shown in section, comprising a block 12 in which passages indicated generally at 14 are formed. An inlet passage 14a has a supply 16 of fluid under pressure connected thereto by an inlet port 18. Two outlet passages 14b,c branch from the inlet passage 14a. Two control passages 14d,e oppose one another on either side of the inlet passage just in front of the branch 14f between the two outlet passages 14b,c. The control passages are supplied by control ports 20d,f which are interconnected by a closed loop conduit 22. When fluid passes along the inlet passage 14a and enters the diverging branch 14f it tends to cling to one side or the other under the influence of the Coanda effect, and preferentially enters one or other of the outlet passages 14b,c. In fact, the effect is so strong that, provided the pressure region upstream of the outlet passages 14b,c is favourable, more than 90% of flow in the inlet passage 14a will enter one or other of the outlet passages 14b,c. The outlet passages 14b,c are connected to respective outlet ports A,B.

If the flow is predominantly into outlet passage 14b, for example, then the flow of fluid follows closely wall 14g of the inlet passage 14a and across the mouth of control passage 14d, reducing the pressure in the passage accordingly by virtue of the venturi effect. Conversely, there is not so much flow adjacent control passage 14e. Consequently, a pressure difference is created in the control loop 22 and fluid flows from control port 20f, around control loop 22, and enters control port 20d. Eventually, the flow out of the control passage 14d becomes so strong that the flow from inlet passage 14a to outlet passage 14b detaches from the wall 14g containing the mouth of control passage 14d, and instead attaches on the opposite wall 14h, whereupon such flow is switched to passage 14c. Then, the opposite condition pertains, and the pressure in control port 14e is reduced, and grows in control port 14d, whereupon the flow in control loop 22 reverses also. The arrangement therefore oscillates, in known manner, dependent on several factors including the length of loop 22, which length affects the inertia of the control flow and the speed with which it switches. Other factors including the geometry of the system, back pressure from the outlets and the flow through the diverter 10 also affect the frequency.

The arrangement shown in FIG. 1 conveniently comprises a stack of several Perspex™ plates each about 1.2 mm thick and laser cut with the outline shape of passage 14. Top and bottom cover plates close and complete passage 14 and hold the stack together, the bottom (or top) one being provided with the ports 18, 20d, 20f, A, and B. However, it has been shown experimentally that the arrangement scales up effectively and is within the ambit of the person skilled in the art.

Figure 2:
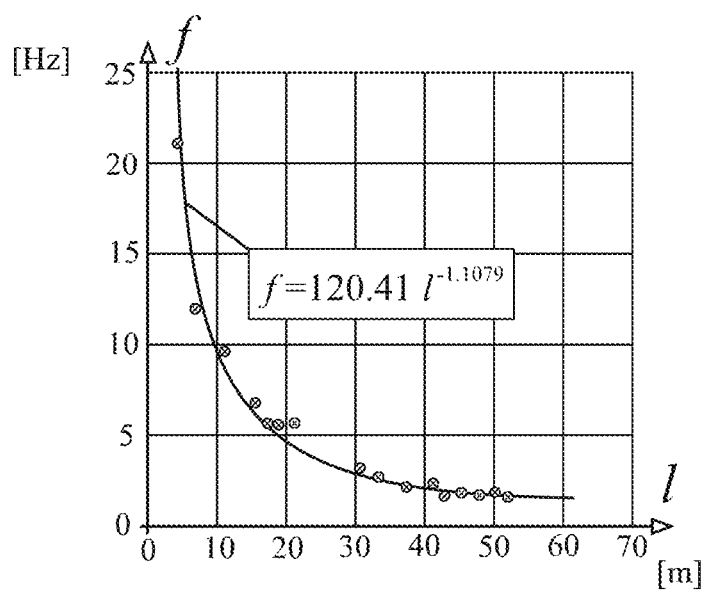
FIG. 2 is a graph of oscillation frequency plotted against feedback loop length for one arrangement of the diverter shown in FIG. 1.

FIG. 2 illustrates the variation of frequency of oscillation of one system employing air as the fluid in the diverter of FIG. 1, with a control loop of plastics material of 10 mm internal diameter and an airflow of 10 liters per minute. Frequencies between 5 and 25 Hz are easily achieved. Again, the arrangement is capable of being scaled-up to provide significant airflows in this range of oscillation frequency.

Figure 7:
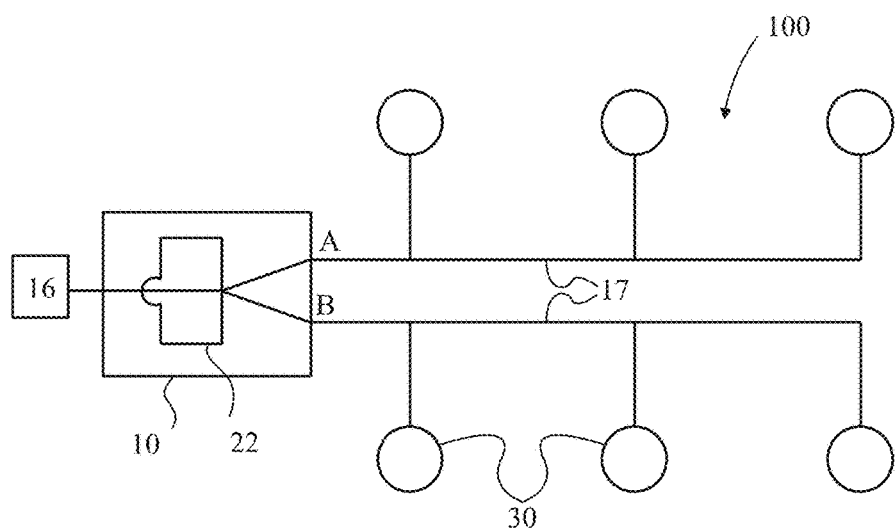
FIG. 7 is a schematic illustration of the overall arrangement of a preferred embodiment of the present invention.

When the outputs A,B of diverter 10 are connected to bubble diffusers 30 in an arrangement 100 such as illustrated schematically in FIG. 7, finer bubbles are produced than when a steady flow rate of similar magnitude is employed. Several diffusers 30 are connected in parallel to each outlet port A,B by appropriate tubing 17. Moreover, because the bubbles are finer, fewer large bubbles are produced: they are detached sooner by virtue of the oscillating air supply.

Figure 8:
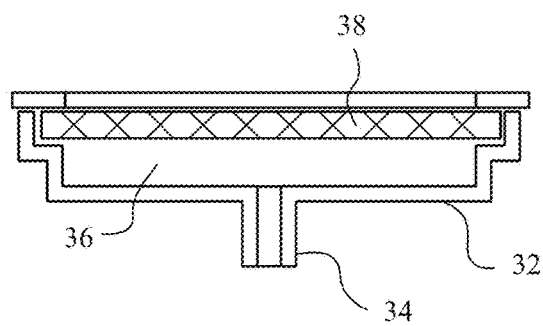
FIG. 8 is a cross section through a bubble generator of the system of FIG. 7.

A suitable diffuser 30 is shown in FIG. 8, which comprises a housing 32 of shallow, hollow cylindrical form and having a central inlet opening 34 for connection to the tubing 17. The chamber 36 formed by the housing 32 is closed by a porous disc 38, which may be ceramic, or a sintered metal. Such bubble diffusers are known and in use in the water treatment industry, and such products are available, for example, from Diffuser Express, a division of Environmental Dynamics Inc of Columbia, Mo., USA.

Indeed, as regards FIG. 7, the only part not already employed in the present sewage treatment industry is the diverter 10, and the arrangement of the present invention provides the opportunity for retro-fitting the method of the invention into existing installations, simply by interposing a diverter 10 of appropriate size and configuration into the supply to an existing network of diffusers 30. Other forms of diffuser do, of course, exist and are applicable to the present invention.

While described above with reference to sewage treatment, as mentioned above, the present invention may have application in numerous other fields in which a gas needs diffusing into a liquid. In the sewage treatment regime, other than in the search for efficiency, the equality of the bubble size or their absolute minimisation in size may not be imperative. Rather, the capacity to retro-fit the arrangement may be more important. However, in new installations, or in other applications where, for particular reasons, a very small bubble size, and very even bubble size distribution, is desired, the arrangement illustrated in FIGS. 4 and 5 may be employed.

Referring first to FIG. 3, two plots are shown of internal pressure against bubble size being formed from two apertures of different size (0.6 and 1.0 mm). The pressure increases substantially linearly with increasing volume until the bubble reaches a hemispherical shape. Thereafter, however, pressure decreases as the bubble grows further. Thus, at any given pressure, a bubble can have two sizes. More importantly, however, if two bubbles are growing from two ports that are supplied by a common source in parallel with one another then as the pressure increases with growing bubble size, the growth of the two bubbles in parallel is stable. However, once the bubble reaches hemispherical the stable growth ends and as one bubble continues to grow its pressure diminishes. Consequently, if there should be any imbalance between the growth of the two bubbles so that one reaches hemispherical and beyond first, the pressure in the one whose growth is slower will be higher, rather than lower, than the bubble whose growth is faster. Consequently, what occurs is that faster growing bubbles grow larger and slower growing bubbles are smaller and may never detach.

In FIGS. 4 and 5, a diffuser 50 comprises a plate 52 having a top surface 54 in which a right-angled groove 56 is formed, with each of its sides 58,60 being angled at 45° to the top surface 54. Under the surface but parallel thereto are two supply passages 62,64 also lying parallel, and disposed one on either side of, the groove 56. Rising up from each passage are a plurality of ports 62a,64a. Ports 64a are relatively narrow and open in the middle of the face 60 of the groove 56. Ports 62a are relatively broad and open at the base of the groove 56. There are as many ports 62a as there are ports 64a, and each port 62a is arranged opposite a corresponding port 64a. Moreover, the passage 62 and the ports 62a are arranged so that the direction of discharge of fluid from port 62a is parallel the face 60 of the groove 56.

Passage 62 may be larger than passage 64, but the ports 62a are certainly larger than the ports 62b. The reason for this is that the passage 62 is arranged to carry liquid, the liquid in which the diffuser 50 is sited. The passage 64, on the other hand, carries gas. The arrangement is such that the diameter of the gas port 62b is small, according to the desired size of bubble to be formed, and possibly as small as 0.5 mm or less depending on the technique employed to form the port 64a. In Perspex™-type material, the holes can be drilled mechanically to about 0.5 mm, but other methods exist to make smaller holes if desired.

Figure 6:
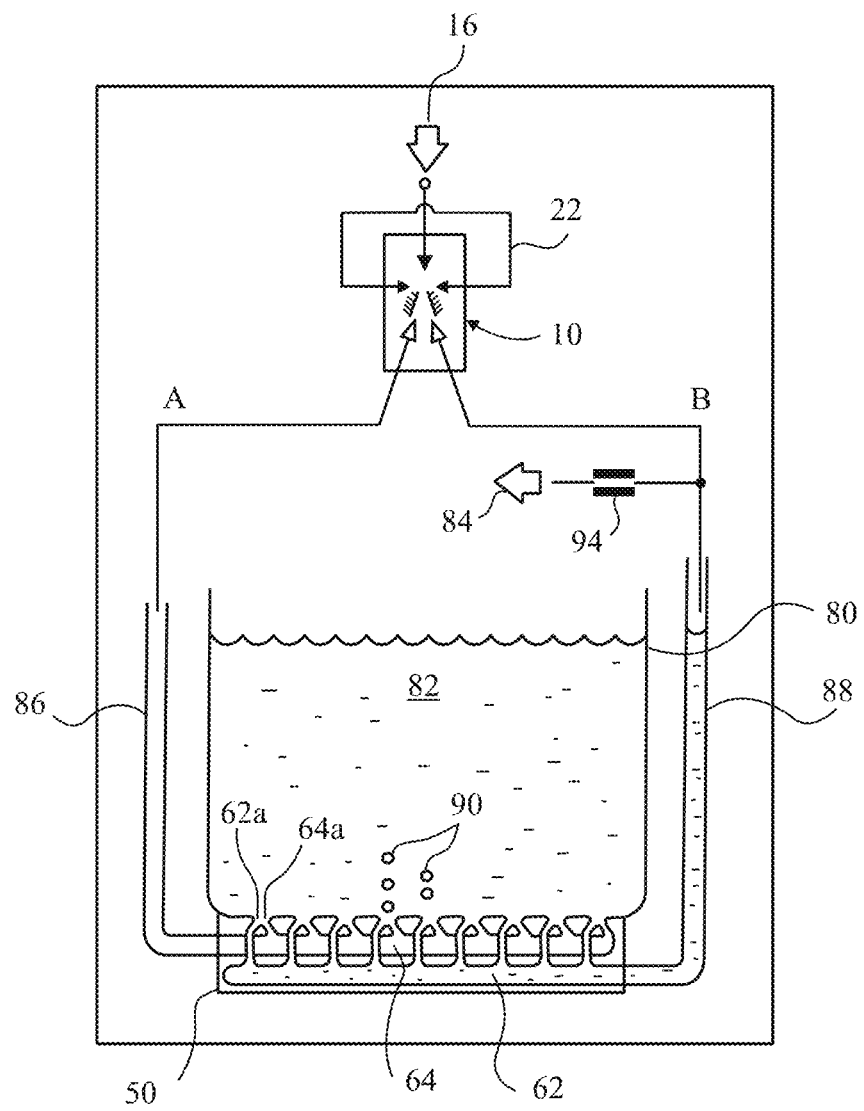
FIG. 6 is a schematic illustration of the overall arrangement employing the bubble plate of FIGS. 4 and 5.

Turning to FIG. 6, a tank 80 of liquid 82 has a diffuser 50 in its base. A gas supply 16 supplies gas under pressure to a diverter 10 of the kind shown in FIG. 1, and whose two outputs A,B are connected to passages 64,62 respectively by lines 86,88 respectively. However, while outlet connection A and line 86 are closed, connection B has a bleed 84 to the environment above tank 80, so that its pressure is substantially ambient. Consequently, line 88 fills with liquid to the height of the liquid in the tank 80. Indeed, when the air supply 16 is turned off, so does the outlet A and consequently the diverter 10 is located above the level of the liquid in the tank.

However, when the air supply 16 is turned on the pressure in branch A grows, albeit oscillatingly, to half the supply pressure, and this is arranged to be greater than the hydrostatic pressure at the bottom of the tank 80 so that air ultimately passes along the passage 64 and exits the ports 64a forming bubbles 90 in the liquid 82. When a pulse of pressure arrives in outlet B, the level of liquid in the line 88 drops, since the bleed 84 is controlled by a valve 94 transmitting the pressure pulse into a flow of liquid into the passage 62 and out of respective ports 62a. However, when the diverter switches flow back to outlet A, the hydrostatic pressure in the tank 82 returns the liquid through ports 62a refilling the line 88. Whether the line 88 is refilled entirely, so that the pressure outlet 88 is ambient by the time flow is switched again to outlet B is purely a design matter. It can be arranged that only when the pressure in the line 88 is substantially at the hydrostatic pressure near the bottom of the tank 80 is there sufficient pressure in the line 88 to bleed enough gas through the valve 94. In any event, the liquid level in the line 88 must be arranged at some point between the top and bottom of the tanks, and to oscillate above and below that level as gas supply is switched to and from the output B.

The ports 62a are larger simply because of the increased resistance of the liquid to flow, but also because a large flow pulse, rather than a narrow flow jet, is better at knocking off bubbles.

The back pressure regime in outputs A,B is arranged such that it does not adversely interfere with the oscillation of diverter 10, and each pulse into output A is arranged such that a hemispherical bubble forms at the mouth of each port 64a. When the pulse switches to output B, a jet of water issues from the mouth of each port 62a and is directed against the side of the bubble on the ports 64a and knocks them off. The bubbles 90 so formed are therefore very small, or at least much smaller than they would otherwise be, and of very even size distribution.

When the arrangement described above is employed with a liquid of relatively low viscosity such as water, it works very well. However, when it is employed with more viscous liquids, such as oil, a different mechanism is observed which gives rise to an alternative arrangement of the present invention (shown in FIG. 9 and described further below) and possibly an alternative explanation as to why the oscillation of the gas in a retrofit situation described with reference to FIGS. 7 and 8 may work, or indeed how the arrangement described with reference to FIGS. 4 to 6 may be working.

Figure 9:
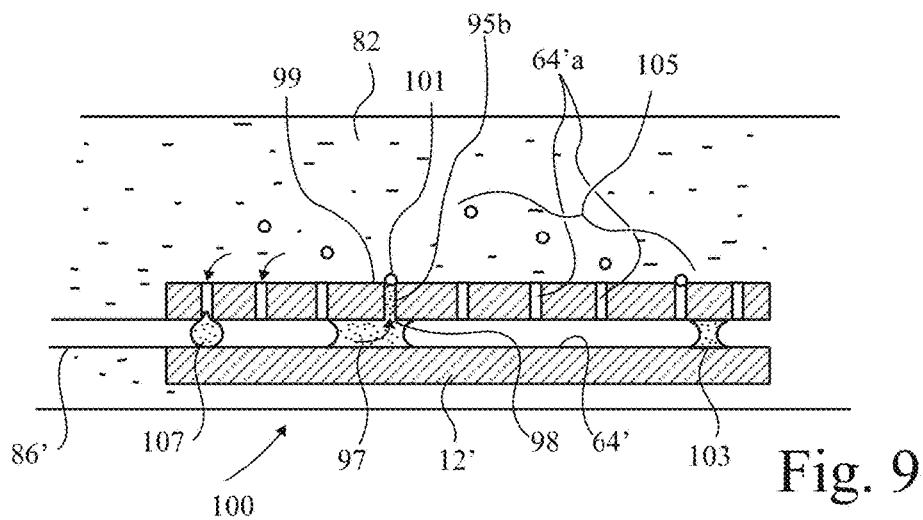
FIG. 9 is a section through a bubble generator according to the fourth aspect of the present invention.

FIG. 9 illustrates a bubble generator 1000, in which a plate 12' has a conduit 64' having a plurality of ports 64a' connecting the conduit 64 with the liquid 82 in which bubbles are to be formed. The conduit 64' is connected via tube 86' to a source of gas under pressure greater than the pressure of the liquid in the ports 64a', so that there is a net flow of gas along the conduit 64'. However, at the same time, the gas is also oscillating by virtue of a fluidic mechanism (not shown in FIG. 9) such as the diverter 10 of FIG. 1.

With high viscosity liquids such as motor oil as the liquid 82, the oscillations can be seen to permit introduction of some of the liquid into the conduit 64' through some of the ports 95. The exact mechanism is not yet explained, although could be through the venturi effect of high flow of gas periodically through the conduit 64' drawing liquid through certain of the ports (eg ports 95a), or it may be due to the low pressure phase of the oscillations and the relatively higher pressure in the liquid at this point in the gas pressure cycle. In any event, despite there being a net flow of gas through the conduit 64' and out of the ports 64a', nevertheless, plugs 97 of liquid appear in the conduit and progress along it, driven by the net flow of gas. As they travel along the conduit, they progressively close off mouths 98 of the ports (eg port 95b) and liquid enters the ports behind the gas already in the port. When the plug liquid contacts the main body of liquid 82 at the open end 99 of the port, the gas/liquid interface in the port completes the gas/liquid interface of bubble 101 presently being formed by the gas. Consequently it is easily detached from the port 95b and released into the liquid body 82.

With this mechanism, an inclined series of bubbles rise from the ports 64a'; and possibly several such streams, if several plugs 97 form (as shown for example at 103 where the plug is almost exhausted having pushed off a series of bubbles 105 and losing some of its volume to the main body of liquid 82). Also a new plug 107 is shown being drawn into the conduit 64'.

If such a mechanism is working with lower viscosity systems, (where the mechanism is more difficult to observe by virtue inter alia of the greater frequency of operation of such systems), then the above described mode of operation of the knock off system shown in FIGS. 4 to 6 may not be complete, or even entirely correct. However, the skilled person can find an arrangement that suits the particular requirements of a given application. Indeed, if the theory described above with reference to FIG. 9 is correct, it may explain why the oscillating gas produces fine bubbles. They may be produced not because the of the oscillations per se causing inertial movements of the liquid that pull off bubbles from the open end of the exit ports, as described above and pinching the bubbles off, but rather that plugs of liquid get entrained into the system and push off bubbles from behind.

Figure 10A:
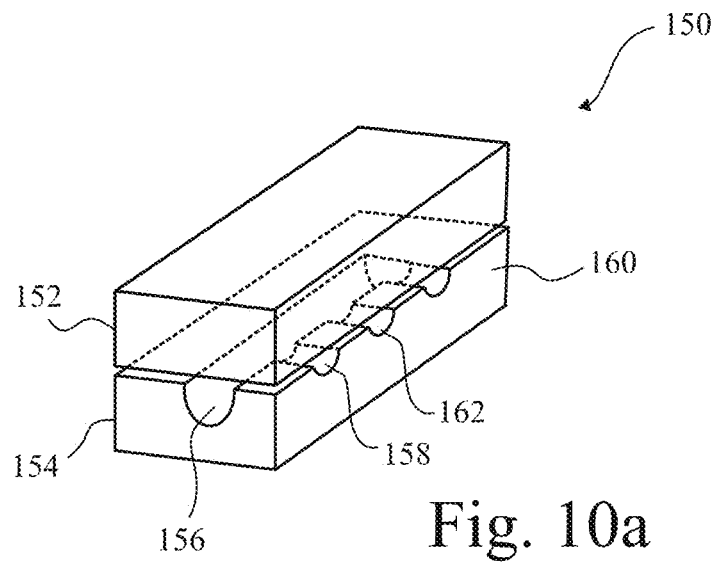
FIGS. 10 a and b are respectively a schematic perspective view of a diffuser employed in a method according to the present invention and a side section showing bubble pinch-off.
Figure 10B:
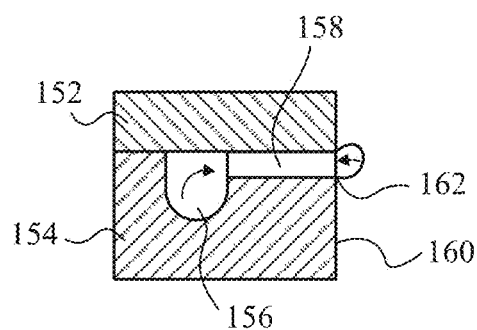

In FIG. 10, a glass diffuser 150 is constructed from two sheets of glass 152,154 adhered face to face, in which, on one sheet 154, channels 156,158 have been etched, so that, when connected as shown, a large conduit 156 is formed from which several smaller conduits 158 depend and emerge at surface 160 of the diffuser 150. In use, when connected to one branch of a diverter (such as that shown in, and described above with reference to, FIG. 1), bubbles are formed at the openings 162 of each conduit 158. If the channels 158 are approximately 60 microns in depth and width, bubbles of a corresponding diameter are pressed from the conduits 158. If the gas flow is oscillated as described above, bubbles of that size break off. However, if the face 160 is rendered horizontal, it is, in fact, possible for bubbles much larger than that to be formed, circ 500 microns diameter, with surface tension managing to adhere the bubble to the opening and it merely growing, albeit oscillatingly, until finally the mass of liquid displaced detaches the bubble. However, when the face 160 is oriented vertically, as shown in FIGS. 10a,b, the rebounding bubble in the first or second oscillation does not fit squarely against the opening but is distorted upwardly by gravity, and this results in the bubble pinching off much sooner. This is particularly the case if the material of the diffuser 150 is non-sticky, as far as the gas, is concerned, and this is the case for glass where the gas is air. Likewise for non-stick materials such as Teflon®. Thus, with nothing else, bubbles of the order of 50 to 100 microns can be produced.

Figure 11A:
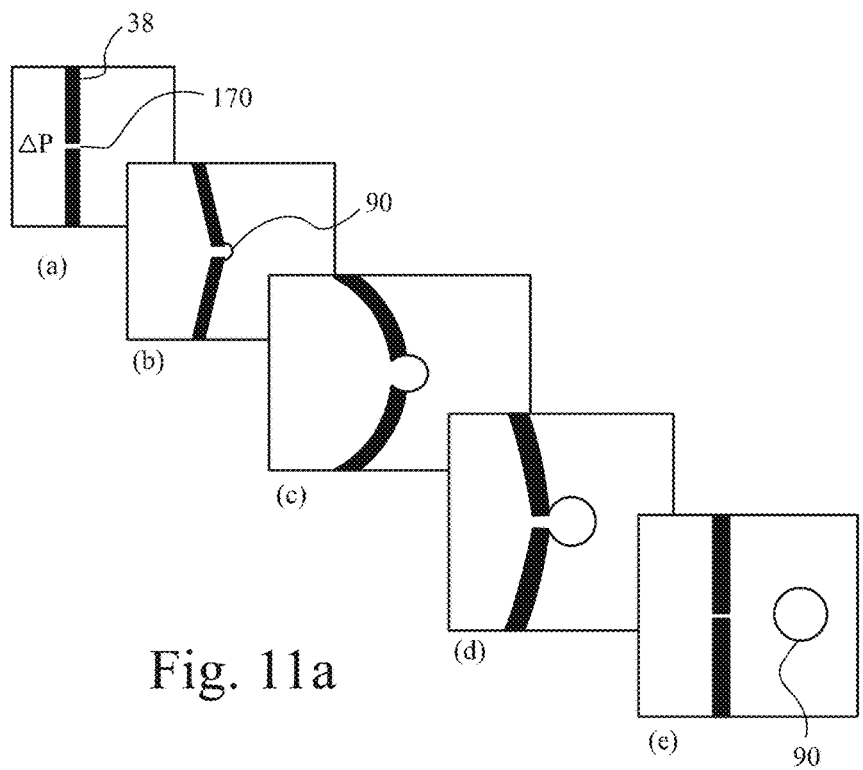

Turning to FIG. 11, some existing diffusers employed in waste water cleaning, such as those illustrated in FIGS. 7 and 8, have a membrane (38, in FIG. 8 and in FIG. 11a) which has a number of slits cut through it. The mode of operation is already oscillatory to some extent, even with a steady gas flow, as the pressure distends the membrane, opens the slits and, as bubbles pinch off, there is a certain rebound of the lips of the slit before a new bubble begins. However, with reference to FIG. 11a and an oscillating gas pressure, the differential pressure ΔP across a slit 170 increases from zero as shown at (a). In (b), the gas begins to deform the membrane 38 and it is forced through the slit commencing the formation of a bubble 90. As the pressure continues to increase, the membrane deforms further, as shown in (c) accelerating the growth of the bubble. However, at this point the pressure differential begins to decrease so that the natural rebound of the elastic membrane is facilitated, closing off the bubble 90 as shown at (d). Finally, with zero pressure the membrane returns to the position shown at (a), and (e) but in the latter with the bubble 90 released.

Figure 11B:
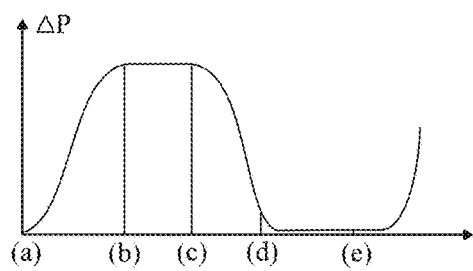

By matching the oscillation of the gas flow to the elastic resonance of the membrane the formation of small bubbles is possible with little energy expenditure. FIG. 11*b* shows a preferred form of square wave pressure development that is potentially the result of both the fluidic arrangement and slitted membrane, and shows the potential pressure positions at each stage of bubble development illustrated in FIG. 11*a*.

1. Application in Algal Separation

Flotation has become the mainstay for colloidal particle separation from an aqueous solution. In essence, the key subprocess is the generation of microbubbles that attach to hydrophobic particles, resulting in buoyant aggregates which then rise to the surface of the flotation cell, where following bubble rupture, the particles are recovered (Dai et al., 2000). Recovery of valuable end-products has been the centre of attraction in flotation separation. A large body of experimental evidence show the reclamation of products such as oil (Al-Shamrani et al., 2002b, Al-Shamrani et al., 2002a, Hosny, 1996, Li et al., 2007, Zouboulis and Avranas, 2000), minerals (Englert et al., 2009), algae (Teixeira and Rosa, 2006, Teixeira et al., 2010) and in cases where water scarcity is the challenge, potable water (Kitchener and Gochin, 1981, Edzwald, 1995) can be achieved by flotation separation.

Algae, in particular, are a reasonable target for flotation separations for biomass processing, but as yet untried with the dense solutions produced from algal cultivation. Pienkos and Darzins (2009) highlight harvesting and dewatering operations as a key challenge for economic algal biofuels processing. The density can reach 10 g/L of dry biomass, which is substantially higher than DAF removal of fine particles in water purification. Gudin and Thepenier (1986) estimated that harvesting can account for 20-30% of the total production cost. Molina et al. (2003) present possibly the closest technique to microflotation for algal harvesting—flocculation and bioflocculation followed by sedimentation. Flotation is often viewed as "inverted" sedimentation. The Jameson Cell (Yan and Jameson, 2004) is an induced air flotation process which also achieves high separation performance for microalgae (98%) and phosphorus. When present in effluent water, algae could be a pernicious contaminant in potable water treatment otherwise, but could be regarded as a raw material given the numerous products obtainable from the unicellular organism such as β-carotene (Borowitzka, 1992) glycerol, biomass and in particular, biofuel from lipid (Chisti, 2007). While most previous works have focused on the production of biomass from algae (Zimmerman et al., 2011b), only few researchers have been concerned with harvesting biomass and lipid from algae. Whether it is for potable water treatment or recovery of algae for biofuel, flotation separation is a viable means for harvesting algae.

However for flotation to be successful, it is vital for particles to be hydrophobic (Gochin and Solari, 1983) and ultimately attach to gas bubbles. Chemical coagulation is employed to aid this process. Through the suppression of the electrical double layer of particles, particle-particle interaction is facilitated, leading to the formation of larger colloidal structures or flocs. Following collision particles adhere to the surface of gas bubbles forming a strong stable particle-bubble union (Dai et al., 2000). Removal of flocs is hugely dependent on the coagulation pH but another important factor is the bubble size and flux. Bubbles enhance particle recovery by providing the lifting force necessary for transport and separation. Separation efficiency varies inversely with bubble size (Dai et al., 1998, Dai et al., 2000).

Application of gas bubbles in liquid is gaining extensive application across many fields. Generally, these processes entail efficient ways of facilitating bubble-particle interaction in the liquid rather than merely passing the bubbles through the liquid without it actually adhering and lifting the particles out of solution. Best practices however, require that the particles in the aqueous solution attain optimum collision, attachment and stability efficiencies respectively (Derjaguin and Dukhin, 1993) with the gas bubble for complete capture prior to reaching the liquid surface. As such, one of the most efficient ways of achieving this is miniaturising the bubbles. Due largely to their high surface area to volume ratio, particle flotation by small bubbles occur more rapidly and efficiently. Ahmed and Jameson (1985) estimate a 100-fold enhancement in separation performance for fine particles with bubble size reduction from approximately 700 to 70 microns. Further, small bubbles have gentle convective force relative to large bubbles by reason of their low rise velocity (Schulze, 1992), resulting in tender contact with fragile flocs. To this end, several microbubble generation techniques have been thus developed for flotation applications. Examples include: turbulent microflotation (Miettinen et al., 2010), Induced Air Flotation (IAF) (El-Kayar et al., 1993), Dissolved Air flotation (Edzwald, 2010), and Electroflotation (Hosny, 1996). Of the several techniques available, dissolved air flotation and dispersed air flotation are the most widely developed. Specialist microbubble separations have been achieved in minerals processing with colloid gas aphrons, which are charged microbubbles (Cilliers and Bradshaw, 1996; Waters et al. 2008).

1.1 Dissolved Air Flotation

Dissolved air flotation (DAF) in particular is the most efficient and widely employed flotation option. According to Henry's law, the process essentially requires dissolving air in water at very high pressure. By so doing, the solution becomes supersaturated; leading to nucleation of microbubbles as soon as pressure is reduces at the nozzle. Unfortunately, this process is energy intensive, due to the high pressure required for air dissolution in water as well as the work done by the pump in feeding the saturator with clarified water.

1.2 Dispersed Air Flotation

Traditional dispersed air flotation involves the supply of continuous air stream directly into a porous material (usually a nozzle or a diffuser) from where bubbles are generated. By comparison with other microbubble generation methods, this technique is less energy consumptive. However, the natural problem associated with this method is the difficulty in small bubble production.

1.3 Example of the Invention in Use

Figure 12:
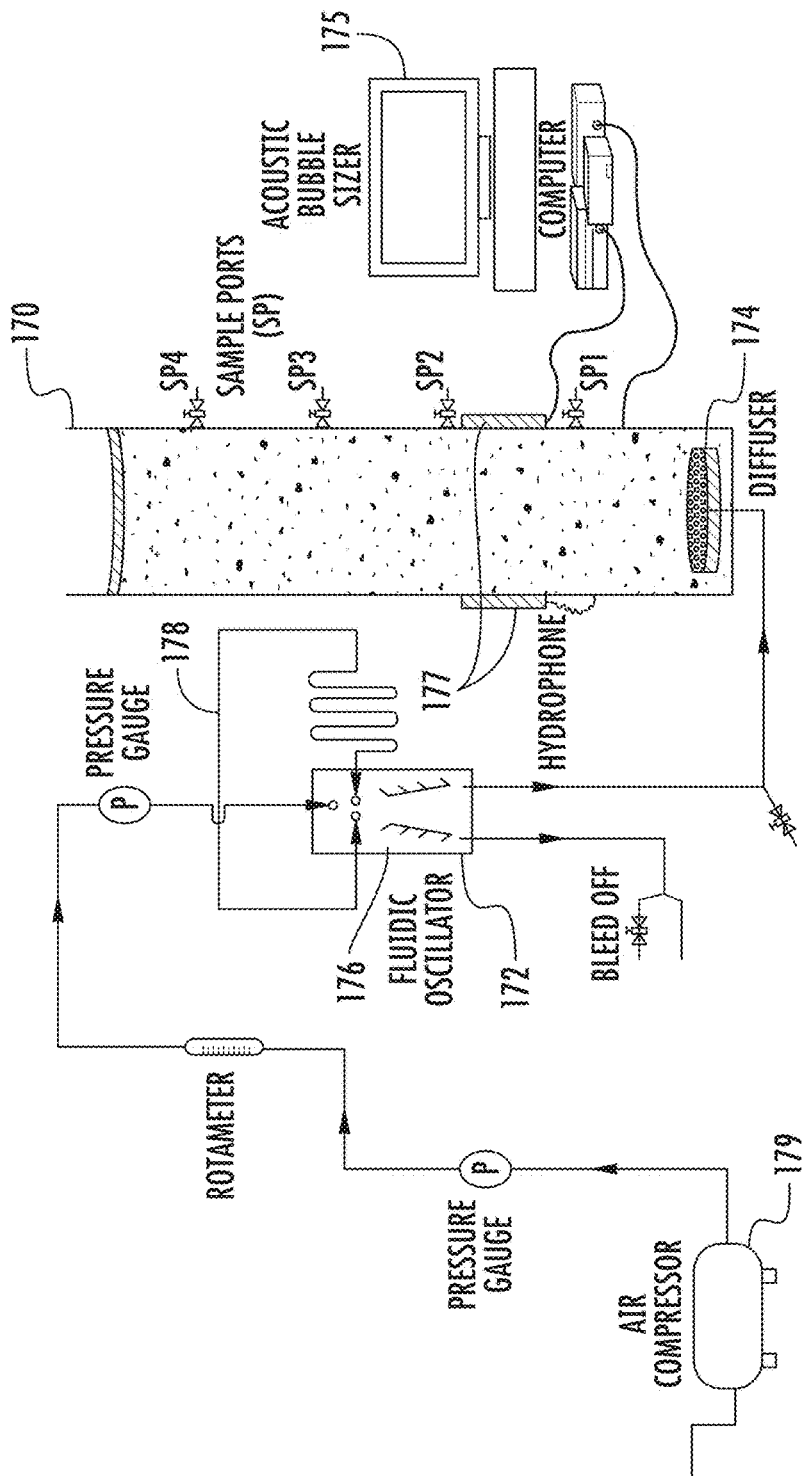
FIG. 12 is a schematic representation of the experimental set-up of an algal floatation separation unit in accordance with an embodiment of the present invention.

A schematic representation of the bench scale dispersed air flotation unit is shown in FIG. 12. The main rig components comprise: a flotation cell 170, microbubble generator comprising a fluidic oscillator 172 and 40 mm stainless steel baffle distributor diffuser 174. The fluidic oscillator 172 (Tesar et al. 2006), (Tesař and Bandalusena, 2011) measures: 10 cm×5 cm×5 cm in length, height and width respectively while the flotation unit measures: 50 cm by 9 cm in height and diameter respectively. The tests were conducted with the diffuser placed at the bottom of the flotation cell 170. The oscillator mid-port 176 was linked by a 0.5 m feedback loop 178. The supply in the form of a compressor 179 delivered air at a pressure of 0.8 bars and a supply flowrate of 85 L/min through the oscillator. Microbubbles were generated under oscillatory flow by connecting the diffuser to the outlet of the fluidic oscillator.

Three inorganic metallic coagulants were used: aluminium sulphate, ferric III chloride and ferric sulphate (Sigma Aldrich, UK), while hydrochloric acid and sodium hydroxide (Sigma Aldrich, UK) were used for pH adjustment. The tests were conducted across five pH ranges and five coagulant concentrations.

*Dunaliella salina* 19/30 obtained from the Culture Centre of Algae and Protozoa (CCAP), Oban, Scotland was previously pre-cultured in a 250 L airlift Loop Bioreactor containing 248 L of *Dunaliella salina* growth medium (Zimmerman et al., 2011b) for 2 weeks. Following that, the microalgae from the laboratory scale 250 L airlift loop bioreactor was transferred to an outdoor 2200 liter ALB for field trials at Scunthorpe, UK. The microalgae were grown with waste $CO_2$ from steel plant exhaust gas. After ~17 days, the cultured microalgae from the ALB were emptied into several drums and delivered back to the laboratory for harvesting. Several months after growth the microalgae culture was taken for further processing. Two liters of microalgae sample at room temperature (20° C.) was mixed to break lumps and disperse the cells homogenously in solution following sedimentation and clustering of cells as a result of prolonged storage. Coagulation and flocculation followed for 4 mins and 10 mins respectively following pH adjustment. Immediately after flocculating with a mechanical stirrer at 70 rpm, the broth was gradually introduced into the flotation column to a height of 30 cm above diffuser before the microbubble generator was turned on. The diffuser used in this study was made of Perspex material and measures 40 mm in diameter and overlaid with a stainless steel mesh (Plastok, UK) with pore size of 38 μm and an open area of 36%. Broth samples were collected every three (3) minutes from sample ports SP1,2,3 and 4, and measured with the calibrated spectrophotometer DR 2800 (HACH Lange) to assay absorbance at 663 and 640 nm wavelength. Recovery efficiency (R) was determined using the formulae:

$$R = \left(\frac{C_i - C_f}{C_i}\right)_{100}$$

where $C_i$ and $C_f$ are the initial and final algae concentrations respectively.

1.4 Bubble size Distribution Measurement

There are two main methods for measuring the size of bubbles generated in a liquid: namely optical and acoustical techniques.

The acoustic bubble sizer (Dynaflow, Inc.) was developed to meet challenges in the optical method caused by cloudy liquid. By exploiting the ability of bubbles to affect acoustic propagated waves, bubble size and population can be extracted at varying frequencies (Wu and Chahine, 2010). The device consists of a pair of transducer hydrophones 177, made of piezoelectric materials inserted in a polyurethane material to prevent contact with water. Both hydrophones are connected to a computer 175 via a control box. The transmitting hydrophone generates short bursts of sound signals within a set frequency which are then received by the second hydrophone after travelling through the liquid. The signals are then analysed by special in-built software for processing the phase velocity and attenuation within the desired frequency range to estimate the size distribution of bubbles. The acoustic bubble sizer (ABS) was used in this study for bubble characterisation. The two sets of flat hydrophones 177 used (measuring: 7.5×7.5×2.5 cm, optimal operating frequency range from 70~200 kHz and corresponding bubble size of 34-100 μm) were mounted vertically (9 cm apart) on either side of the flotation column 170. Three (3) runs were undertaken to determine bubble size distribution under oscillatory conditions.

1.5 Bubble Size Distribution

Figure 13A:
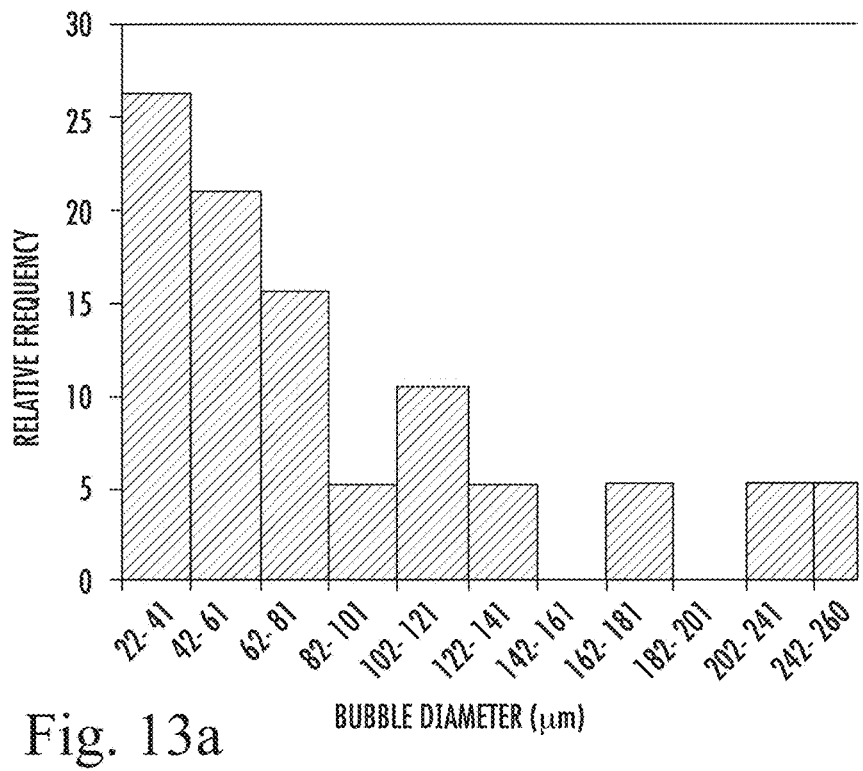
FIGS. 13 a and b are histograms of (a) bubble size distributions and (b) bubble density from a stainless steel mesh diffuser used in the set up of FIG. 12.

Microbubble generation is an essential part of flotation separation. FIG. 13a presents the distribution of bubble size generated under oscillated air supply conditions. The single peak graph shows a positive skew of bubble size distribution which reveals the dominance of 24 μm sized bubbles. The smallest bubble produced was 24 μm, while the largest size measured was 260 μm. However, average bubble radius was 86 μm with 60% of the bubbles approximately 74 μm. The average bubble size generated with the fluidic oscillator is approximately twice larger than the diffuser 174 pore size (which is 38 μm). By contrast, without the oscillator, the average bubble size achieved was approximately 28 times larger than the diffuser pore size (ie over 1 mm).

Figure 13B:
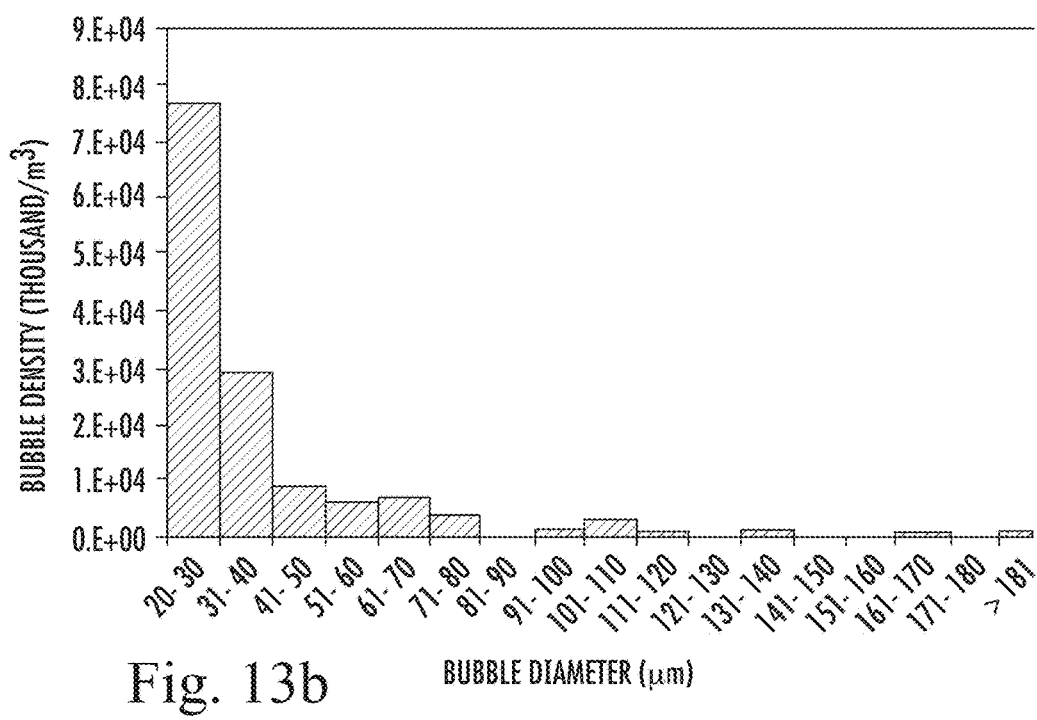

The bubble density graph presented in FIG. 13b was determined by measuring the population of bubbles in the column and the results showed that 20-40 μm bubbles made up 95% of the total bubble density, while 5% consisted of bubbles greater than 40 μm in a bubble size distribution of 20-260 microns. The narrow distribution range of bubble size not only strongly suggests the production of largely non-coalescent but more particularly, relatively uniformly sized microbubbles.

The difference in bubble size is simply attributable to the fluidic oscillator. The bistable device facilitates microbubble production by oscillating a stream of the continuous air supply. The pulse generated due to the oscillation helps to knock-off bubbles at the developmental stage. Without oscillation, bubbles tend to move irregularly, leading to increased bubble-bubble interaction and coalescence leading to larger bubbles. Regular detachment results in less coalescence because the bubbles are more uniformly spaced and sized. The level of inertial force in the pulse can be tuned so that bubbles emerge with little excess kinetic energy over the terminal rise velocity (Parkinson et al., 2008).

1.6 Algal Recovery

Understanding the step-wise processes prevalent in a multi-floc system between particle-bubble interaction in a flotation column is both interesting and informative. See FIG. 14i for photographs of three stages of separation. Initially, a sludge blanket immediately begins to form. Larger flocs are preferentially collected first before smaller flocs. The residual biomass of algae in the tank decreases exponentially with time in a first stage. However, removal efficiency decreases as the gradient of biomass Vs time in FIG. 14ii. Similar behaviour is found with each of the three flocculants tried.

Stage 1 is simply attributable to the large surfaces of flocs which readily render them susceptible to bubble collision and adhesion, bubble formation at particle surface, microbubble entrapment in aggregates and bubble entrainment by aggregates. (Edzwald, 2010) reported these bubble-particle interaction mechanisms in the review of flotation as a wastewater treatment. These large flocs also engage in sweep flocculation as they travel upwards under the lift of microbubbles; hence the exponential biomass recovery efficiency recorded at the early stage.

After half the separation time (being the sum of Stages 1 and 2 together), the amount of large flocs decreases markedly. During the next, straight-line, phase (Stage 2), smaller flocs become prevalent in the flotation unit. Biomass concentration only reduces slightly and as such recovery efficiency hardly changes. In the second stage, surface sludge build-up continues, thickening the sludge blanket. As more bubbles rise to the top, these bubbles compress the sludge layer from underneath, reducing the water content of the sludge.

The third key stage is primarily characterised by intensive sludge thickening and thinning. By that is meant increasing density of the sludge layer, and hence reducing depth, which makes separation of the sludge easier to achieve. At this stage, the majority of the particles have been separated, ending the separation phase, whereby microbubble rise velocity is increased, since very few particles are present to cause rise retardation. The rate of water removal from the sludge is thus high as it is compressed. The sludge layer is reduced to almost a quarter of the initial size.

1.7 Coagulant and Effect of pH

Chemical pre-treatment is essential in decreasing the effect of repulsive charge between bubbles and flocs. The success of chemical pre-treatment depends on pH, because pH determines the solubility of chemical constituents of nutrient and metals in solution and influences the form and quantity of ions produced. Optimum pH and coagulant dosing reduces the charge on particles to about zero causing particles to be more hydrophobic (Edzwald, 2010). To investigate the effect of pH on separation, trials were conducted across different pH levels and results reported in FIG. 15.

Figure 15A:
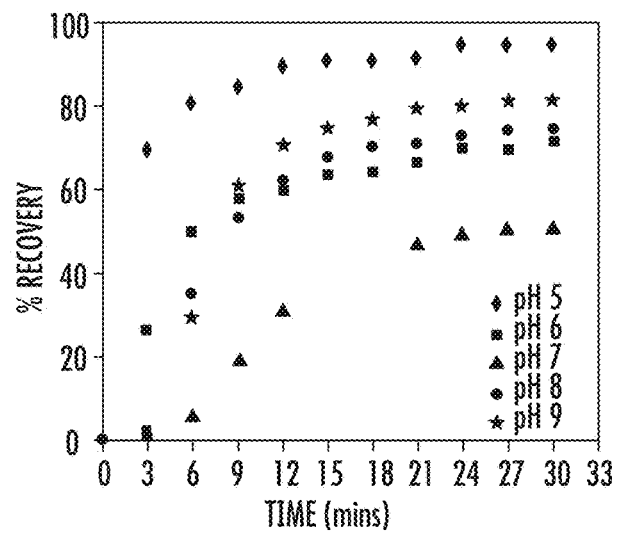
FIGS. 15 a to c are graphs of recovery efficiency at 150 mg/L coagulant dose against time at varying pH levels for all three metallic coagulants mentioned with respect to FIG. 14ii.
Figure 15B:
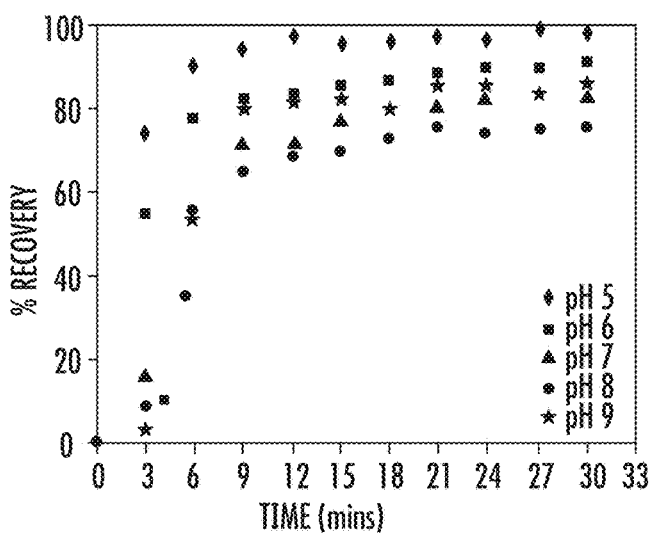
Figure 15C:
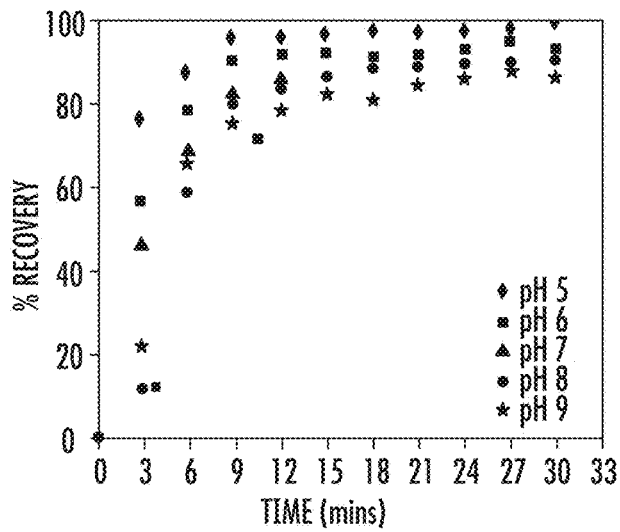
Figure 16A:
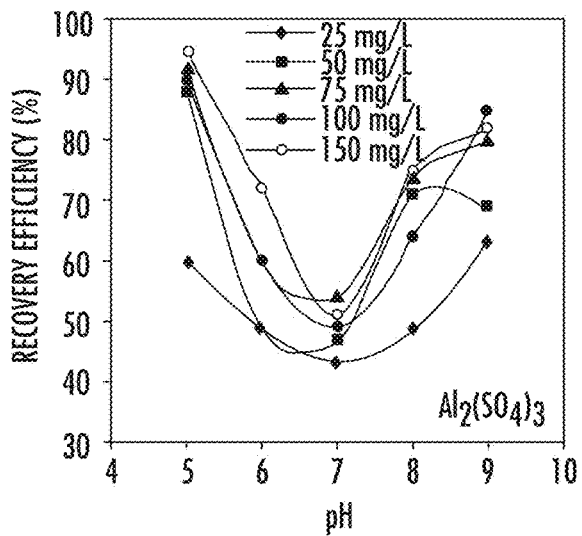
FIGS. 16 a to c are plots of algae recovery efficiency as a function of pH at different coagulant concentrations.
Figure 16B:
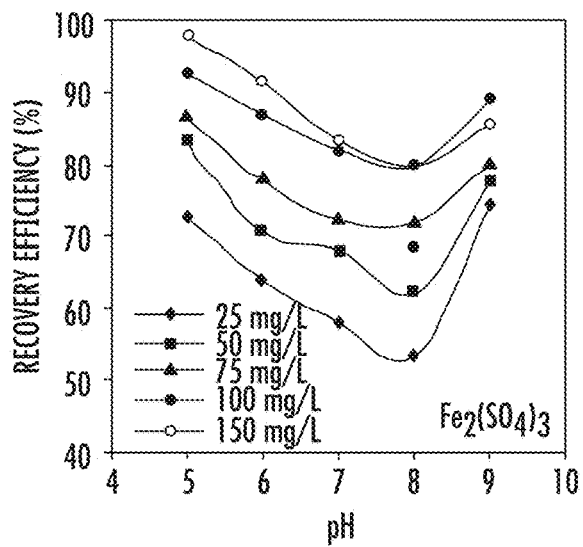
Figure 16C:
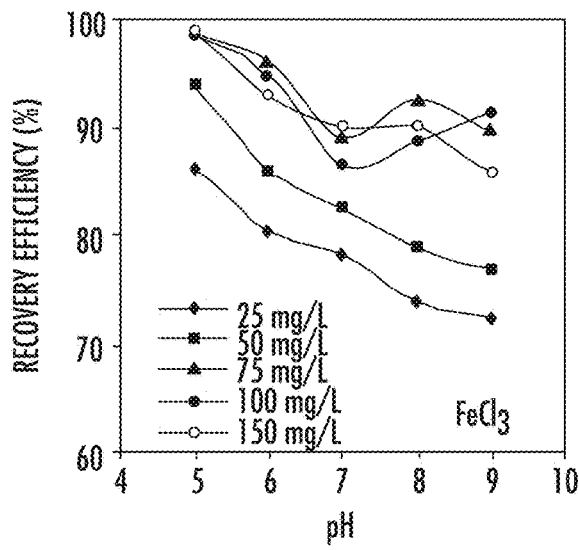
Figure 17A:
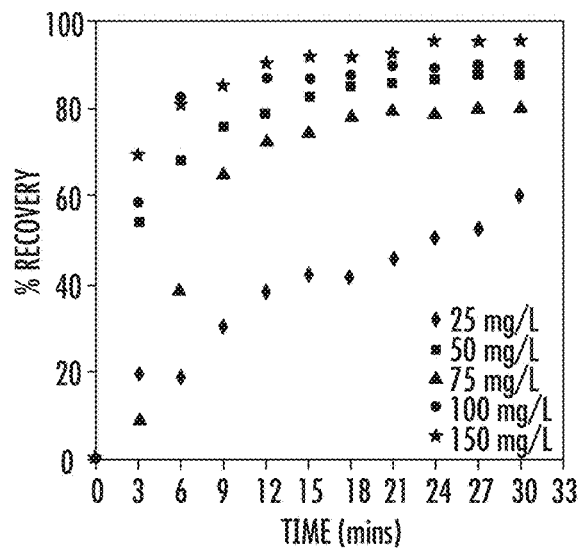
FIGS. 17 a to c are graphs of algae recovery efficiency at pH 5 as a function of time at varying coagulant concentrations for the three metallic coagulant types.
Figure 17B:
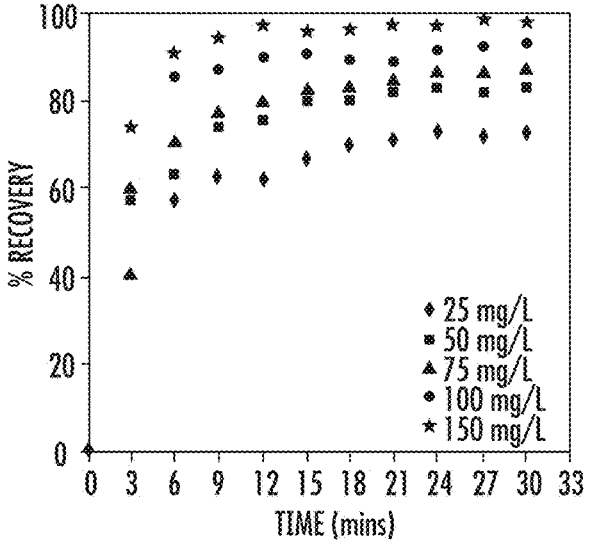
Figure 17C:
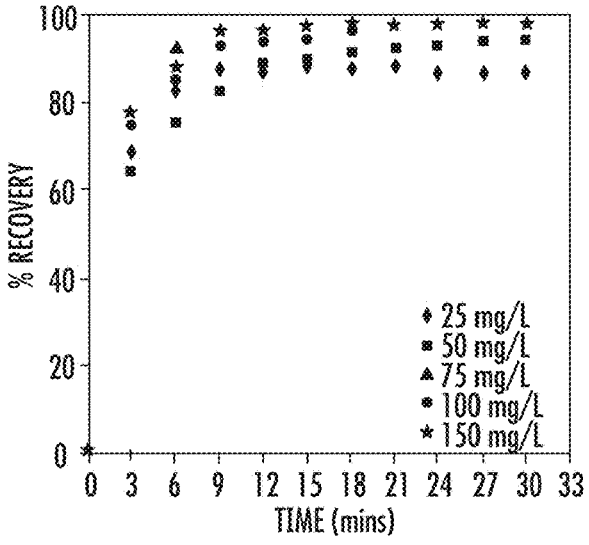

FIGS. 15 and 16 present the flotation results for three metallic coagulants. The effect of pH on algal removal efficiency from FIG. 15(a) showed that with aluminium sulphate coagulant, efficiency increases with decrease in pH to the lowest at pH 7 before rising again as pH increases to 9. Optimum recovery result of 95.2% was obtained at pH 5 with efficiency gradually decreasing to 71.9% at pH6 and 50.6% at pH 7. At pH 8 however, a sudden increase to 74.6% was obtained and 81.5% at pH 9 indicating the other peak of result with aluminium sulphate. Data from FIG. 15(b) (ferric sulphate) can be compared with FIG. 15(a) which showed a similar trend in the effect of pH on algal recovery efficiency. Again two peaks were observed on either side of the pH range experimented in this study. Best results were obtained at pH 5 with 98.1%, followed by 91.6% at pH 6. The drop in performance continued to 83.2% at pH 7 before hitting the lowest with 80% at pH 8. At pH 9 however, the performance was observed to rise sharply to 85.5%.

From the graphs in FIG. 15(c), however, it is apparent that the result with this coagulant (ferric chloride) was different. Algal recovery efficiency dropped monotonically and nearly linearly with pH decrease. Optimum result of 99.2% was achieved at pH 5 and then 93.1% at pH 6. The recovery result further decreased to 90% for both pH 7 and pH 8 respectively and finally to 86.4% at pH 9. Graph 15(c) is quite revealing in several ways. First, unlike the first two graphs, overall efficiency was higher. The least efficiency at pH 9 was higher than the 80% mark. Thus with this coagulant, efficiency ranged from 86.4%-99.2%.

In general, the optimum cell recovery result in these experiments was found at the lowest pH studied. FIG. 16 reveals a trend in recovery efficiencies for the different coagulants studied with aluminium sulphate exhibiting a non-monotonic tendency across all concentrations studied, followed similarly by ferric sulphate. Recovery efficiency with ferric sulphate nonetheless shows a fairly monotonic response as pH drops. One explanation for the non-monotonic behaviour observed for ferric sulphate is contactless flotation (Jiang et al. 2010). One would infer that isoelectric points for all three coagulants are achieved with acidic conditions, so the alkaline high separation with ferric chloride would not naturally be achieved by zeta potential neutrality. By adding metallic inorganic coagulants such as iron and aluminium salts in solution, coagulation is achieved with the coagulants dissociating into $Fe^{3+}$ and $Al^{3+}$ respectively as well as other soluble complexes having varying high positive charges. Essentially, the rate and extent to which these trivalent ions and other complexing species adsorb onto colloidal surfaces is pH dependent. At room temperature, under acidic pH, trivalent species-$Fe^{3+}$ (Wyatt et al., 2011) and $Al^{3+}$ (Permitsky and Edzwald, 2006) are the dominant species in the continuous phase. These predominant trivalent species are the most effective in colloidal charge neutralization and attach to the negatively charged algal cell. The excess $H^+$ present under low pH react with hydroxides of these metals to further release the trivalent metal species. As a consequence, more $Al^{3+}$ and $Fe^{3+}$ species become available again for charge neutralization but the amount of hydroxides species is reduced. As pH shifts away from acidity however, $H^+$ concentration becomes less than $OH^-$ and the amount of trivalent ions present in solution reduces. These prevalent $OH^-$ react freely with the available trivalent metallic species to form the corresponding metallic hydroxide species. As such, hydroxide species become predominant under alkaline conditions attaching to algal cells and precipitating as large gelatinous flocs. Permitsky and Edzwald, (2006) and Wyatt et al. (2011) reported increased concentrations of hydroxide species for aluminium and ferric salts respectively as pH moves beyond pH 7 at room temperature. This explains the large flocs generated under alkaline condition. It is for these reasons the recovery efficiency is observed to increase again under alkaline pH.

Considering that large flocs are good vehicles for sweep flocculation, one might wonder why, despite the relatively large flocs formed at pH greater than 7, the overall efficiency under alkaline condition recorded for aluminium and ferric sulphate coagulant was still lower than results under acidic state. Under the same operating conditions of flowrate, bubble size and flux, this observation can be explained by the difference in charge density of species. The higher the size and charge of the species, the more effective the coagulation process will be. Because these charges increase with increasing acidity, recovery efficiency is highest under acidic pH. In addition, relatively larger flocs are developed under alkaline state and given that as particle size increases the residence time of the rising microbubble-floc agglomerate also increases leading to prolonged flotation time. Moreover, the lifting force of microbubbles diminishes with increased particle size (Miettinen et al., 2010).

By contrast, the condition is quite different for $FeCl_3$ though. Whilst a similar tendency occurs under acidic condition, $FeCl_3$ exhibits a rather different behaviour under basic pH. It is noteworthy to reiterate that ferric chloride produced the overall best recovery result. The justification for this is that ferric salts are relatively less soluble than aluminium salts. This observation corresponds with the findings of Chow et al. (1998) on the concentration of iron speciation in solution. Their results showed that the soluble ion concentrations were less than 1% of the total iron chloride amount initially added. In addition, hydroxides of aluminium are amphoteric—containing both basic and acidic functional groups. Furthermore, the addition of ferric salts decreases the solution pH and the closer the pH tends towards acidity, concentration of trivalent species in the solution increases. Wyatt et al. (2011) observed the same occurrence in their study of critical conditions for ferric chloride-induced flocculation of freshwater algae. The optimum pH for algal separation ranges from 5-7 for ferric chloride but for aluminium and ferric sulphate, two ranges are effective-5-6 and 8-9. Overall, the process governing these reactions is very complex and by no means easy to fully detail especially also as the growth medium contains vital and very reactive chemical constituents.

2. Application in Gaslift Bioreactor

Airlift bioreactors have many advantages over stirred tanks. For instance, there are no moving parts inside the reactor, low cost of installation and maintenance, and low energy consumption. However, bio-reactors would benefit from increased efficiency of mass and heat transfer rate in gas-liquid processes. Enhancement of mass transfer rate in gas-liquid interface has been traditionally dependent on increasing interfacial area between gas and liquid phases. The use of microbubbles not only increases surface area to volume ratio, but, also, increases mixing efficiency through increase in the liquid velocity circulation around a reactor. The mixing process in bioreactors is an important and critical factor in determining the efficiency of fermentation process and the nature of design which plays an active role in providing a suitable environment for micro-organisms. The traditional mixing method (i.e., stirred tanks) may yield better performance in the degradation process, yet when the process energy requirement is weighed against the energy obtained from biogas produced, these processes become economically unviable. Therefore, the reduction of the energy required for mixing is one the most challenging targets that is faced by advanced developments of bioprocess applications.

2.1 Bioreactor

Figure 18:
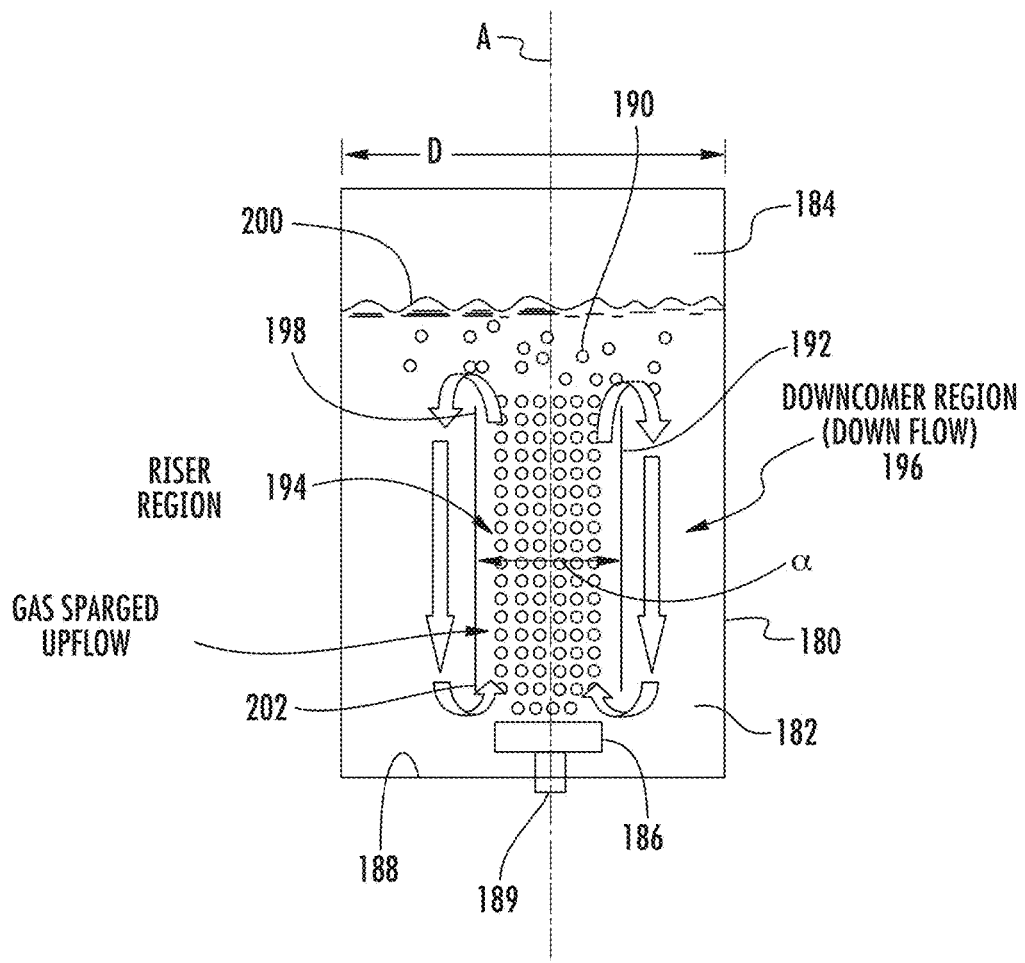
FIG. 18 is a schematic diagram of an airlift tank with internal concentric flow loop.

The airlift reactor (ALR) has been used in several industrial applications, and it has been the most appealing option for any gas-liquid contacting process. It has been noticed that using airlift reactor intensifies the efficiency the process compared to stirred tanks. According to their structure, airlift reactors can be classified into two main types: airlift external loop reactor, in which the circulation takes place in separate conduits; and, airlift internal loop reactor, which is provided with a tube or a plate to create the conduit (channel) inside a single reactor for circulating the liquid inside the reactor. The latter is shown in FIG. 18 and comprises a tank 180 containing a biological liquid medium 182 providing a head space 184. A gas diffuser 186 is provided at the floor 188 of the tank supplied with an oscillating supply 189 of gas from a source (not shown) whereby bubbles 190 of gas may be introduced. A baffle or draft tube 192 divides the tank 180 into a riser section or region 194, immediately above the diffuser 186, and a surrounding annular downcomer region 196.

The tank may be circular cylindrical, with a diameter D, and the draft tube may be likewise circular cylindrical with a diameter d, each centred on the axis A of the tank at which the diffuser is also positioned. The draft tube has a top edge 198, spaced from the surface 200 of the biological liquid medium 182, and a bottom edge 202 spaced from the diffuser 186 and bottom 188 of the tank. A toroidal path is thus established comprising the riser section 194, over the top edge 198 of the draft tube, down the downcomer section 196, and under the bottom edge 202 of the draft tube back into the riser section.

Bioreactor design requires accuracy in choosing the dimensions and materials required for manufacturing due to the complexity of the medium. The biological medium is a multiphase mixture, which consists of solid, liquid and gas, as well as having different microorganisms that need suitable environmental conditions. It is conceivable under such situations to provide reliable control systems for pH and temperature monitoring, in addition to maintain the process under anaerobic conditions (if required). A cylindrical bioreactor shape as airlift gas injection was used in the current study. The ratio (D/d) of the diameter (D) of the bioreactor to the draught tube diameter (d) was 0.7. The volume of reactor was 15 liters, while 8-9 liters were working volume leaving 6-7 liters in the head space.

2.2 Flow Modelling of the Gaslift Digester

A simulation process of an airlift bioreactor was carried out using COMSOL Multiphysics software (Version 4.1). The properties of the process are:

Range of microbubble diameter between 20-1000 µm;
Low gas concentration;
Low flow rate (300 ml/min);
Liquid phase is water;
Gas phase is air; and
The temperature is 298.15 K, the pressure is 1 atm.

A laminar bubbly flow model interface was used for modelling of the two-fluid flow regimes (e.g. mixture from gas bubbles and liquid), driven by gravitation through the density difference between gas-bubble-containing liquid in the riser section 194 and depleted-gas-bubble-containing liquid in the downcomer section 196.

A laminar bubble flow model interface was used for modelling of the two-fluid flow regimes (e.g. mixture from gas bubbles and liquid). Thus, the momentum transport equation is given by:

$$\phi_l \rho_l \frac{\partial u_l}{\partial t} + \phi_l \rho_l u_l \cdot \nabla u_l = -\nabla P + \nabla \cdot [\phi_l \eta_l (\nabla u_l + \nabla u_l^T)] + \phi_l \rho_l g \quad (1)$$

Where $\phi_l$ is liquid volume fraction (m$^3$/m$^3$), $\rho_l$ is density of liquid, $u_l$ the velocity of liquid phase (m/s), t is time (sec), P is pressure (Pa), $\eta_l$ is dynamic viscosity of liquid phase (Pa·s) and g the gravity (m/s$^2$).

For low gas concentration, the liquid holdup coefficient ($\phi_l$) is about unity. Therefore, the change of $\phi_l$ can be neglected in the following equation.

$$\frac{\partial \phi_l}{\partial t} + \nabla \cdot (\phi_l u_l) = 0 \quad (2)$$

$$\nabla \cdot u_l = 0$$

The equation of the gas phase is illustrated as follows:

$$\frac{\partial \rho_g \phi_g}{\partial t} + \nabla \cdot (\phi_g \rho_g u_g) = -m_{gl} \quad (3)$$

Where $\rho_g$ is the density of gas phase (kg/m$^3$), gas volume fraction (m$^3$/m$^3$), $u_g$ is velocity of gas and $-m_{gl}$ the mass transfer rate (kg/m$^3$·s).

For the purposes of approximation, there is considered no mass transfer between gas and liquid phases. Thus the $m_{gi}$=0. Therefore, the continuity equation can be arranged for two phases (e.g. gas and liquid) but without mass-transfer terms as follows:

$$\frac{\partial \rho_g \emptyset_g}{\partial t} + \nabla \cdot (\emptyset_g \rho_g u_g) = 0 \qquad (4)$$

The ideal gas law was used to calculate the density of gas ($\rho_g$):

$$\rho_g = \frac{PM_w}{RT} \qquad (5)$$

Where $M_w$ is the molecular weight of the gas bubble, R is the ideal gas constant (8.314 J/(mol·K)) and T the temperature of gas (K)

The gas volume fraction is estimated by the following equation $$\emptyset_g = 1 - \emptyset_l \qquad (6)$$

The gas velocity can be determined as $u_g = u_l + u_{slip}$, since $u_{slip}$ is relative velocity between two-phases fluid (gas and liquid).

Pressure-drag balance, obtained from slip model, was used to calculate the $u_{slip}$. The assumption of this model suggests that there is momentum balance state between viscous drag and pressure forces on the gas microbubble:

$$\frac{3Cd}{4d_b} \rho_l |u_{slip}| u_{slip} = -\nabla P \qquad (7)$$

where Cd is the viscous drag coefficient (dimensionless), $d_b$ is bubble diameter (m). Given that the microbubble diameters used in the simulation are equal to or less than 1000 μm, the Hadamard-Rybczynski drag law was used, and hence:

$$Cd = \frac{16}{Re_b} \qquad (8)$$

where:

$$Re_b = \frac{d_p \rho_l |u_{slip}|}{\eta_l} \qquad (9)$$

and where $Re_b$ is Reynolds number

On the draft tube 192 and internal airlift bioreactor walls, no slip (u=0) was used in boundary conditions (BCs) for the liquid phase, whilst no gas flux values were used for the gas bubble phase, hence the values of $u_l$ and $n(u_g \emptyset_g)$ equal to zero. On the other hand, the "Gas outlet" and the slip (n,u=0) BCs were used at the top of liquid phase for both liquid phase and gas phase, respectively. On the top of the diffuser 186, no slip boundary conditions were used for liquid phase and the "gas flux" boundary conditions for the gas phase.

Figure 19A:
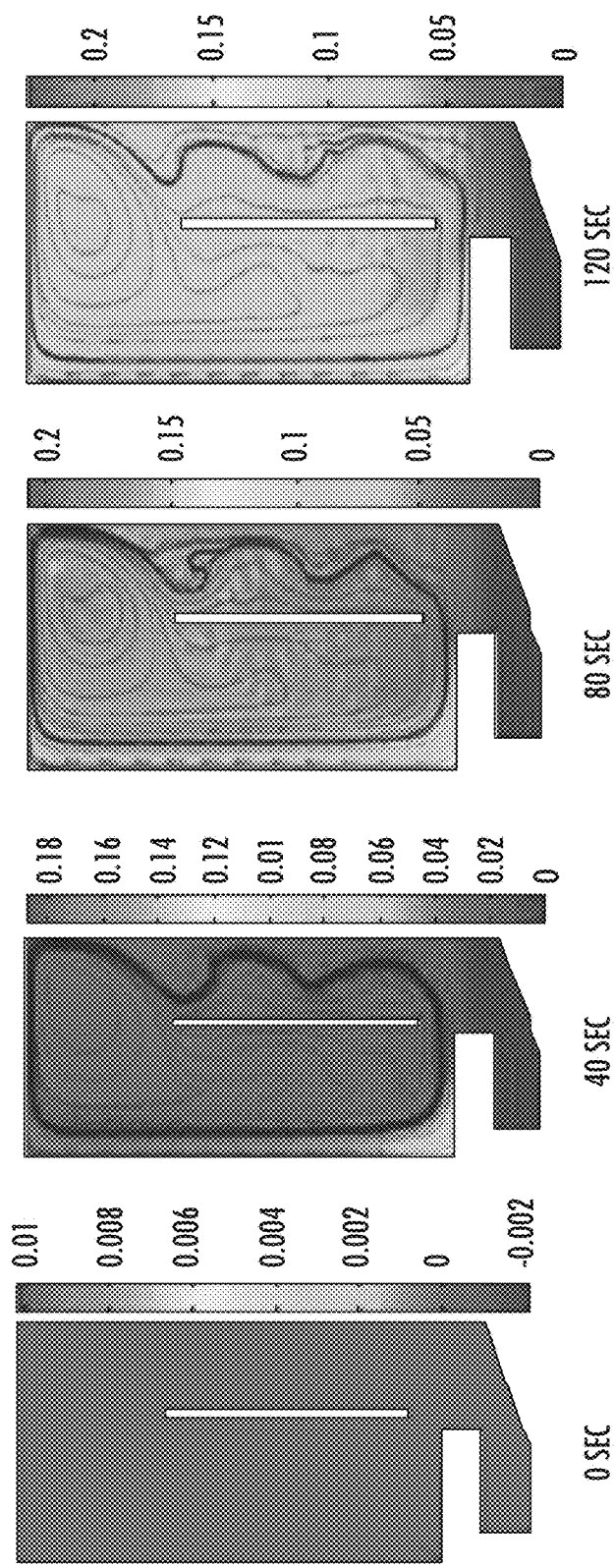
FIGS. 19 a to c are snapshots of simulated gas concentration in the tank (across a half section thereof) at (a) diameter 20 µm and (b) after 100 µm over a development period from 0, 40, 80 and 120 sec after commencement, and (c) after 120 sec for different bubble diameters (20, 60, 100, 120 and 140 µm)
Figure 19B:
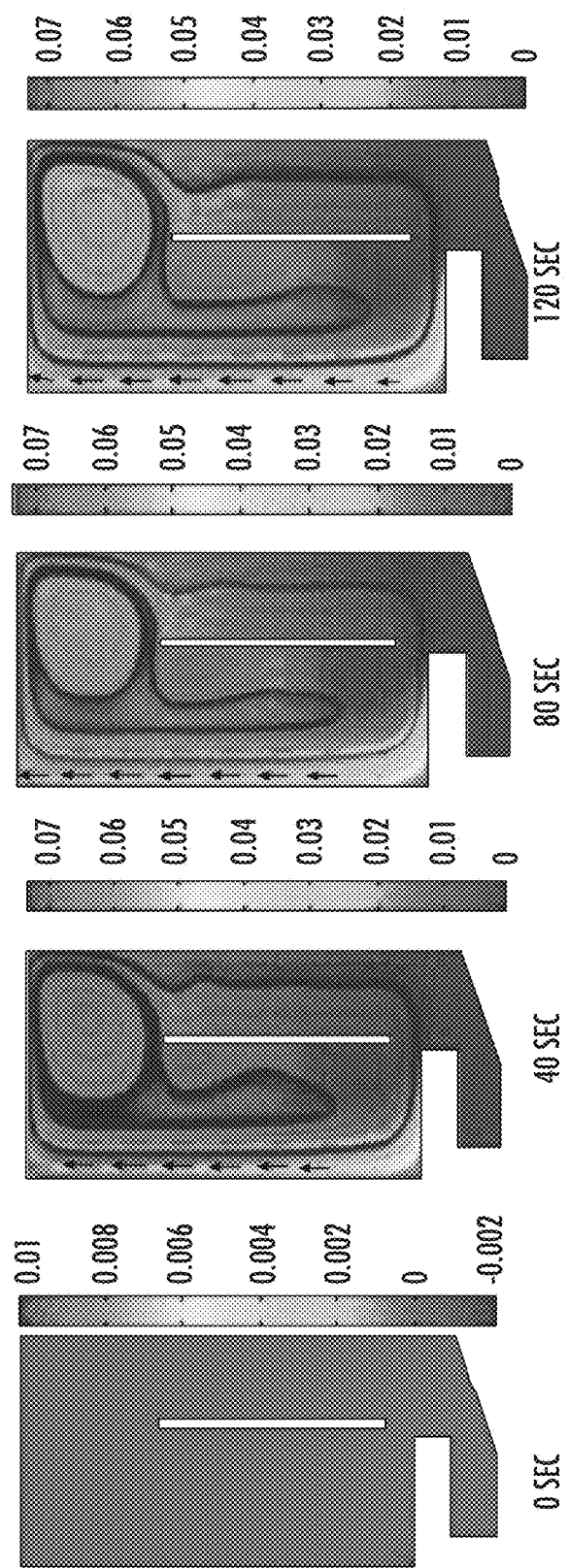
Figure 19C:
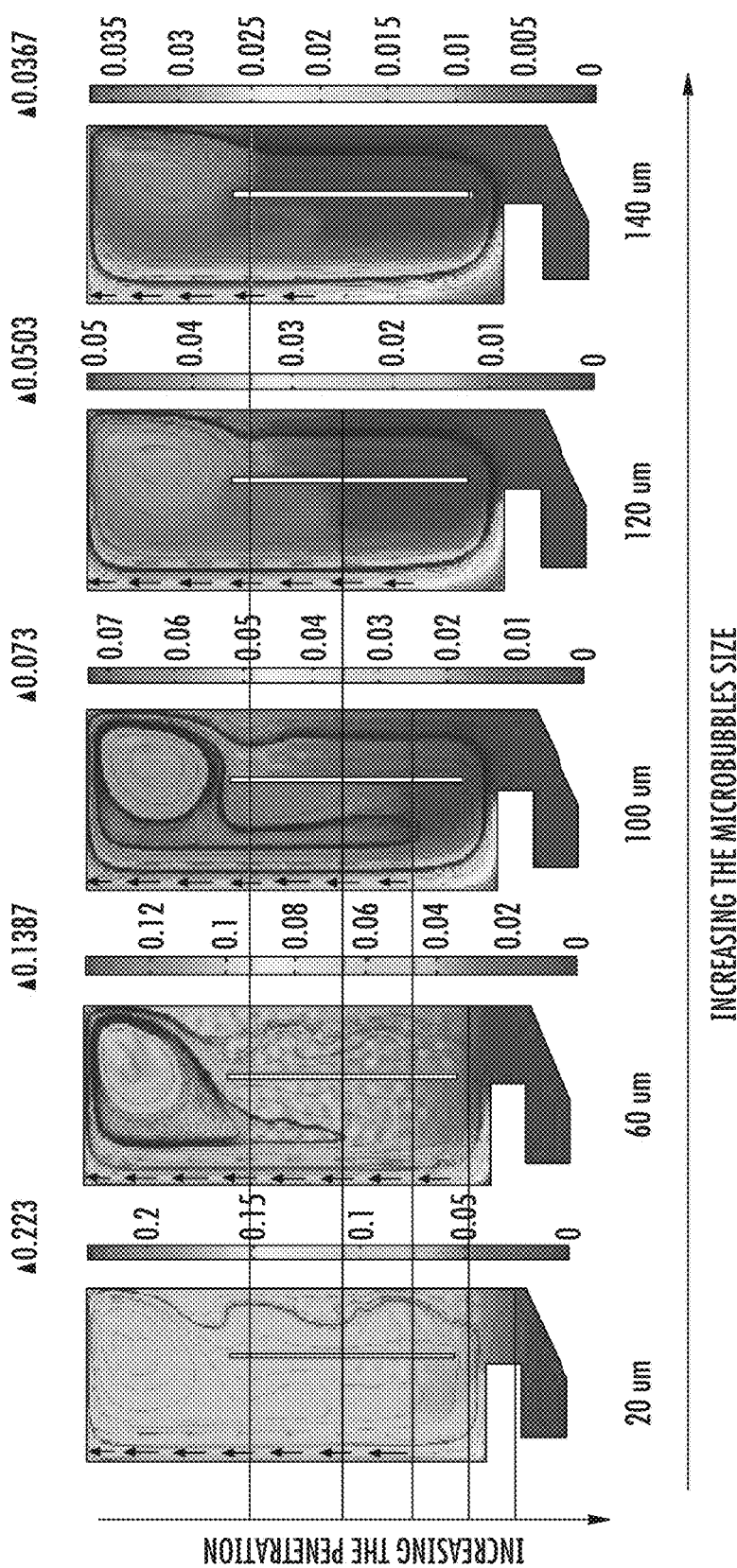
Figure 20A:
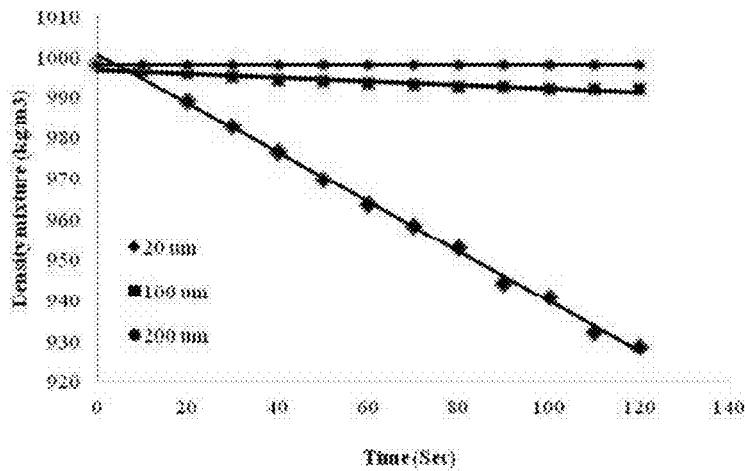
FIGS. 20a and b are graphs showing (a) the mixture density at different bubble diameters (20, 100, and 200 µm) and (b) the volume gas fraction across the downcomer section at different bubble diameters (20, 100, 200 µm)
Figure 20B:
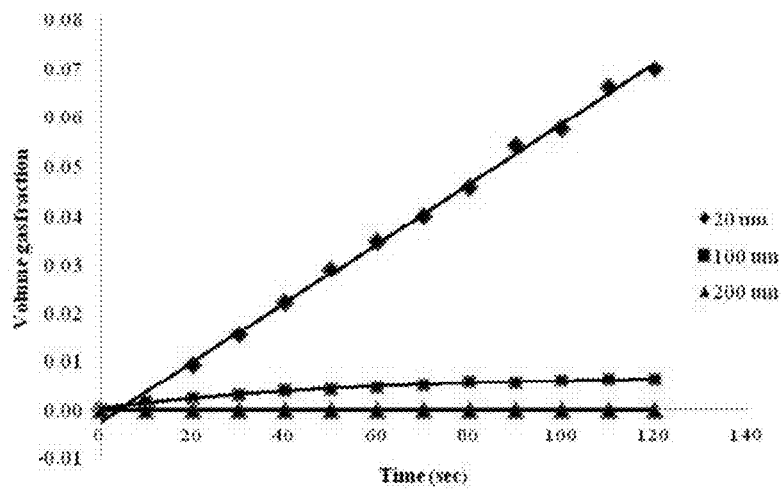

The gas concentration and arrows streamlines of the liquid velocity at different bubble diameters (20, 100, 200, 400, 600, 800, and 1000 μm) over 120 seconds were determined. The results for 20 and 100 μm bubbles are shown in FIGS. 19a and b, while FIG. 19c is a snap shot after 120 sec development at 20, 60, 100, 120 and 140 μm diameters. FIGS. 20 a and b show responses of the mixture bulk density and the volume gas fraction in the "downcomer" zone in gaslift bioreactor at different bubbles diameters (e.g. 20 100, and 200 microns). The responses for other diameters (i.e 400, 600, 800 and 1000 microns) have not been shown in this figure, as there were no changes in response for diameter values over 200 microns. When the diameter of the produced bubbles exceeded 200 μm, both mass transfer and heat transfer were confined within the riser region, because the "downcomer" region, which is equivalent to about 30% of overall volume of the reactor, remained free from gas bubbles. The reason for this observation could be that the liquid circulation is unable to force big bubbles to make further circulations due to their high buoyancy forces, which is proportional to the height of the reactor, and inversely proportional to the diameter of the bubble. Therefore, all gases would leave the reactor beyond this region.

This situation was different when the produced micro-bubbles diameter was less than 200 μm. FIG. 20a shows clearly that the density of the mixture decreases with decrease in the produced bubbles diameter. For example, with bubbles diameter of 20 μm, the density of the mixture was recorded less than that for 100 μm diameter. The reason of this finding could be because of the presence of gas in this region as shown earlier in the FIGS. 19a and b, which is dependent on the diameter of the bubbles. The smaller the micro-bubbles introduced the more likely to penetrate into the bottom of the reactor, via the liquid circulation in the downcomer around the draft tube, due to their decreased buoyancy force and the increased drag force produced, as explained further below.

Therefore, the retention time of the gas bubbles increases dramatically (e.g. doubled, if it is assumed that the rotation of these bubbles has only been for one cycle). Moreover, the residence time of gas micro-bubbles in the "downcomer" zone would be longer than that for the riser zone, if the gravity force is considered. In addition, in certain areas in the downcomer zone, the buoyancy force of the gas bubbles is balanced with their drag force caused by flowing liquid; thus, leading to stationary states of the bubbles velocity, which cause the residence time of these bubbles to increase. Hence, the controllable size of micro-bubbles generated by fluidic oscillation would add another advantage to gaslift bioreactor system by increasing the mass and heat transfer not only in the riser region but also in the downcomer region.

2.3 Liquid and Gas Velocity Profile

The goals of the mixing system in biological processes include prevention of the formation of thermal stratification, maintaining uniformity of the pH, increase of contact between feed and microbial culture, and preventing fouling and foaming. As described earlier, some of biological media are viscous liquids, of high density, and contain solids, grits etc, thus, mixing of these materials thoroughly in order to achieve the desired objectives requires a great effort and energy. In fact, using a bubbling system for mixing of such media is inefficient at certain flow rates. Owing to generation of foams at the top of the culture surface, an increase of induced gas flow rate becomes necessary, perhaps rendering the entire bioprocess uneconomical.

Changing this scenario is possible, however, if micro-bubbles are used in this process, because, the rising velocity of gas bubbles is dependent on the pressure drag-coefficient and bubble diameter. For example, a decrease of bubble diameter causes a corresponding decrease in the Reynolds number, and the pressure drag-coefficient also increases.

Figure 21A:
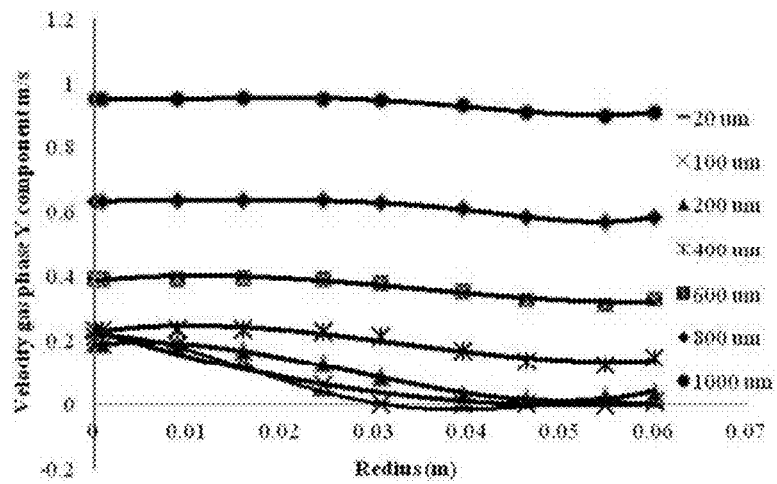
FIGS. 21a to d are graphs showing (a) the velocity gas profile in cross-section riser zone after 120 sec at different gas bubble diameter (20, 100, 200, 400, 600, 800, 1000 µm), (b) the velocity profile at a certain point in the riser zone after 120 sec, (c) the velocity liquid profile across the riser zone after 120 sec at different gas bubble diameters (20, 100, 200, 400, 600, 800, 1000 µm), and (d) the velocity profile in certain point in riser zone after 120 sec.
Figure 21B:
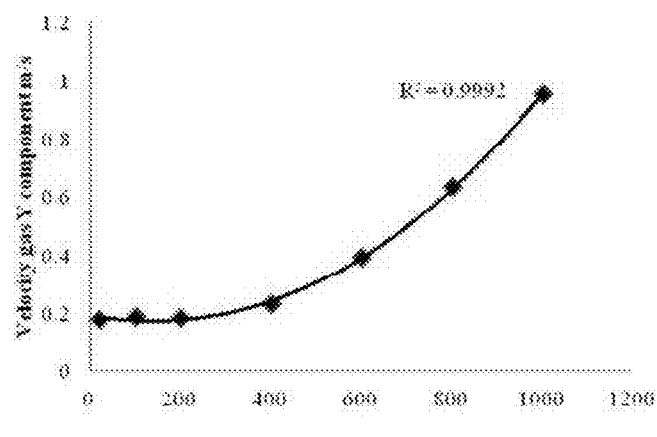

Consequently, a rise in velocity of the microbubbles decreases the drag coefficient. FIG. 21a shows a gas velocity profile in the riser zone, at 0.12 m height level and between 0 and 0.06 m radius from the centre of the tank at different bubble sizes. FIG. 21b shows the gas velocity in the Y (vertical) direction at different bubble sizes in certain points in the riser zone. On the other hand, for purpose of comparison, FIGS. 21c and d show the liquid velocity profile at different bubbles sizes within similar areas, rise times, and distances mentioned above. Collectively, these figures can be discussed together in order to illustrate the benefits of micro-bubbles.

Figure 21C:
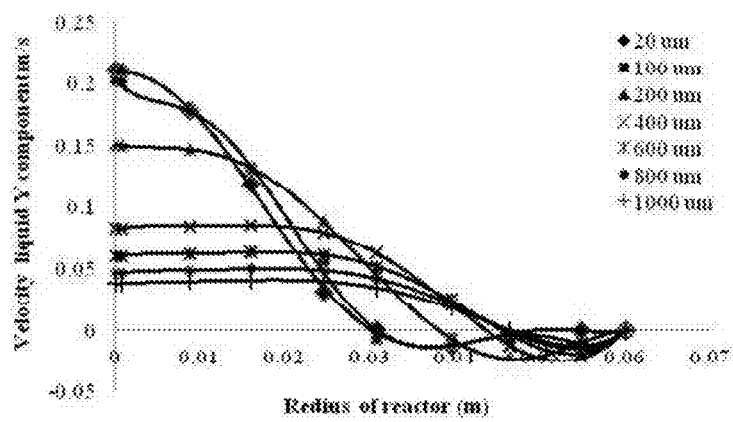
Figure 21D:
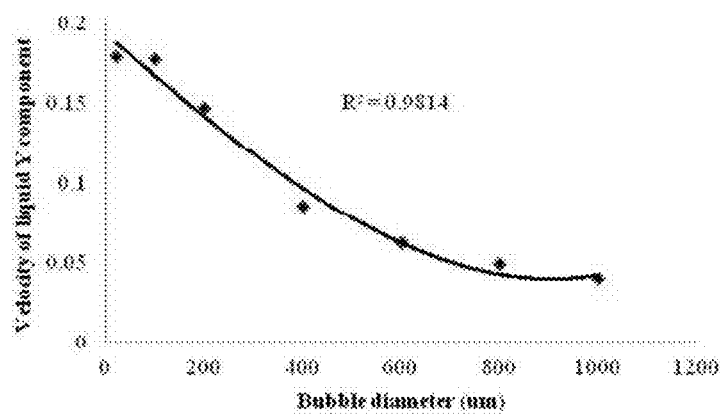

The simulation data showed that below a certain constant flow rate (e.g. 300 l/min), the gas velocity decreases with decrease in bubble size, due to increased drag force against the buoyancy force as shown in the FIG. 21a and FIG. 21b. At similar conditions and flow rates, liquid velocity increases with decrease in bubble size (FIG. 21c and FIG. 21d). Therefore, micro-bubbles would have enough power to move the liquid upwards even at low gas flow rates, and hence, decreasing energy required for mixing.

2.4 Penetration of the Microbubbles

Figure 22A:
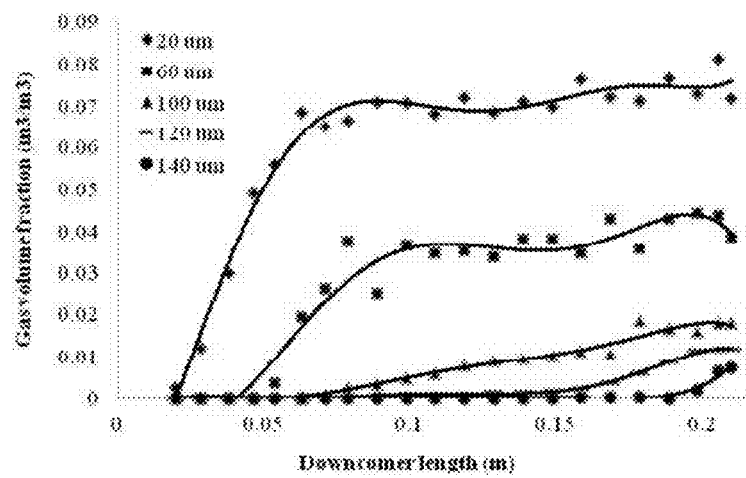
FIGS. 22a and b are graphs showing (a) the gas volume fraction at a certain point in downcomer zone at different gas bubble diameters (20, 60, 100, 120, 140 µm) after 120 sec, and (b) the depth of penetration (hp) of microbubbles into downcomer zone at different bubbles sizes (20, 60, 100, 120 and 140 µm)
Figure 22B:
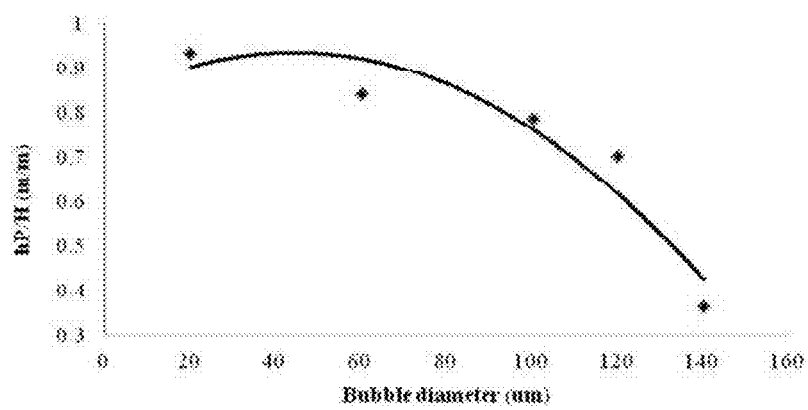

Penetration depth (hp) of the micro-bubble into the downcomer zone was also investigated in the present study. Depth of penetration represents, and can be an indicator, of enhanced efficiency of the mixing system in an airlift bioreactor as a result of the increased residence time in this region. Greater transfer rates of heat and mass would be achieved by higher residence times. The simulation data illustrated that the depth of penetration of the microbubbles increases with decreasing the bubbles size due to a bigger downward drag force compared to the buoyancy force. As mentioned above, that gas volume fraction increases in the downcomer zone with decreasing the bubbles size. FIG. 22a presents the gas volume fraction in downcomer region at various bubble diameters (20, 60, 100, 120 and 140 µm). The penetration of the microbubbles into downcomer depends on their diameter. For example, the depth of penetration of microbubbles with diameter 20 µm was more than was observed for the microbubbles diameter of 100 µm as shown in FIG. 22b, and the snapshots of gas concentration in FIG. 19c.

Microbubbles of smaller sizes penetrate deeper; however, the position of the gas diffuser in reactor has applied an important role in this situation. The gaslift bioreactor was simulated with four different locations of gas sparger 186. Dead zones were experienced with reduced circulation as the gas sparger was raised in the tank. Hence it is better to locate it low in the tank. Likewise the diameter d of the draft tube 192 in the gaslift bioreactor is relevant to circulation. The ratio of draft tube diameter to bioreactor diameter (d/D) was varied from 0.6 to 0.9. The effect of varying d/D ratio on velocity of gas and liquid was investigated. Two bubble diameters (20 µm, 400 µm) were used for investigating effect the draft parameter on mixing efficiency. The simulation data showed a maximum velocity of liquid in Y-axis (along axis A) that could be achieved with a ratio of 0.6 (m/m) is higher than that observed with ratio of 0.7, 0.8, and 0.9 (m/m). A narrow entrance between the diffuser and draft tube also contributed in increasing the velocity of liquid phase in the riser region.

The above considerations apply to any bioreactor including the anaerobic digester discussed below. However, different circumstances call for different requirements and while the above has purely considered the mixing and circulating effects of microbubbles, there is also the case of mass and heat transfer in the contribution of nutrients as well as the exhaustion of waste or product. In the case of algal growth, access to light is essential and, again the circulation and mixing of the tank contents reduces dead and stagnant zones and ensures access of all the entire algal population to light, as well as reducing the tendancy of adhesion to the tank surfaces.

3. Application in Anaerobic Digestion

Anaerobic digestion of already digested sludge by processing in an airlift bioreactor is used for nutrient and energy recovery from biomass. It is used to breakdown organic matter into methane ($CH_4$), carbon dioxide ($CO_2$), hydrogen sulphide ($H_2S$). Digested sludge is dried and used for fertilizer. There are four biodegradation stages. The rate of gas generation through mesophilic anaerobic digestion is generally high, yet the remaining dissolved gases in a digested sludge have a pejorative effect on the environment when they are eventually released, as well as causing operational difficulties. The generation of biogas in an already digested sludge causes cavitation phenomena in pumps. An airlift bioreactor (ALR) is used as anaerobic digester in the present invention to remove the produced gases from digested sludge, with a resultant reduction in pathogens and odour, as well as improvement digested sludge for fertilizer. As already discussed above, ALRs have many valuable benefits in comparison with stirred tanks for instance: there are no moving parts inside the reactor, low cost of installation and maintenance, and low energy required. In addition, using an airlift reactor enhances the mixing efficiency. The process is preferable to agitation by stirring in conventional tanks on power consumption grounds. The experimental data discussed below shows that the cumulative methane production of an airlift anaerobic digester is about 30% more than the observed in the conventional anaerobic digester, and even greater efficiency is achieved, as discussed further below, by nutrient supply.

3.1 Penetration of the Microbubbles

Figure 23:
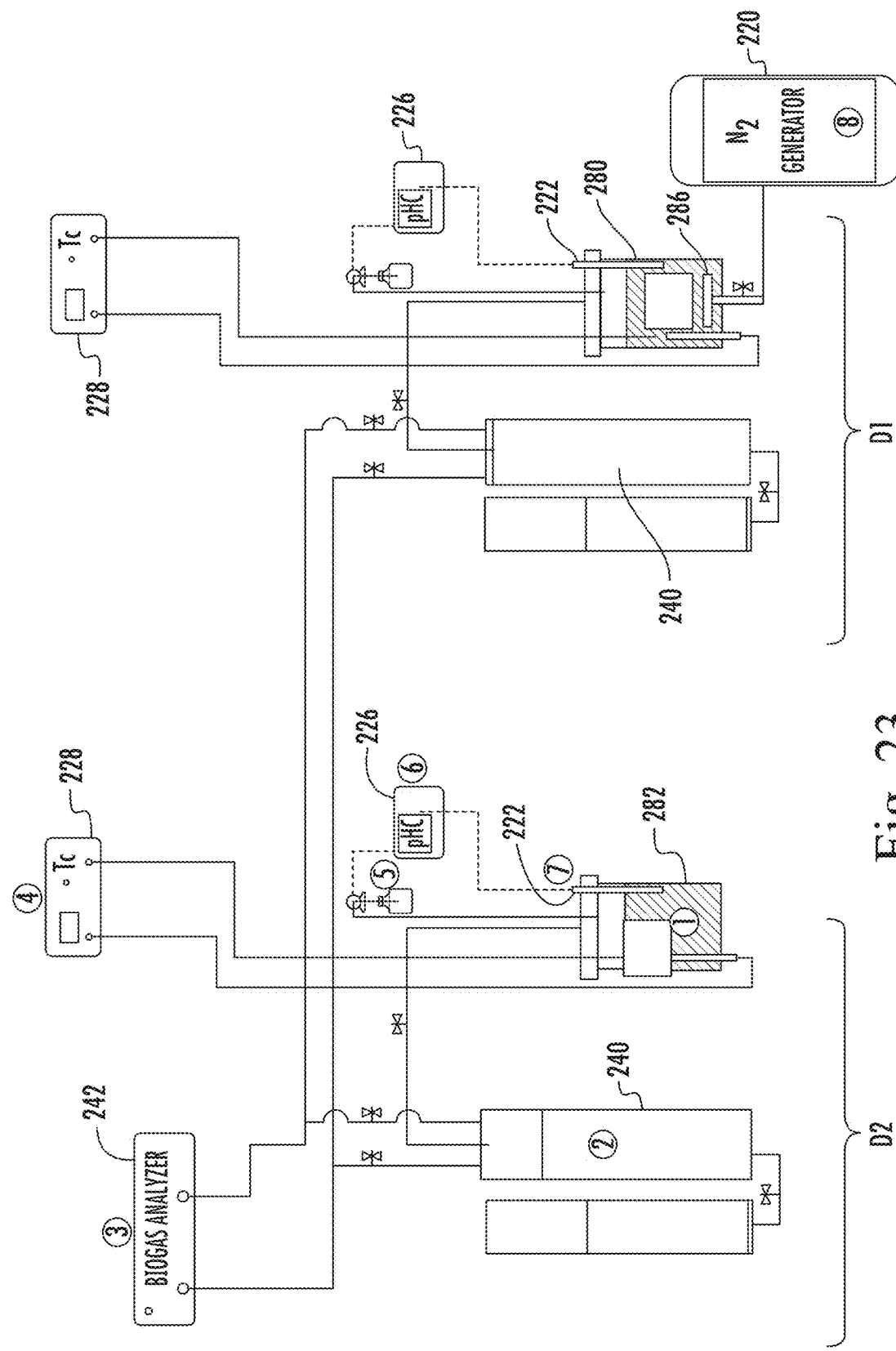
FIG. 23 is a schematic illustration of the experimental apparatus relating to an anaerobic digester in accordance with the present invention.

In a duplicate procedure, two reactors D1,D2 as shown in FIG. 23 were arranged, one (D2) acting as a control, and the other D1 being subjected to bubble injection. Each reactor comprises a digester tank 280, 282, with the tank 280 of the reactor D1 being arranged as the tank described above with reference to FIG. 18. The sparger 286 was supplied with gas from a nitrogen generator 220. Each tank 280,282 was monitored for pH and temperature through probes 222, 224 and respective controls 226,228. Gas evolved from each tank was collected in collector tanks 240, which each was connected through a selectively engageable gas analyser 242.

Fresh sludge, taken from a wastewater treatment plant, has physical, chemical and biological properties. These properties change for several reasons, for instance, the type of wastewater, time of sampling and storage, handling and transfer from the wastewater treatment plant to the laboratory, weather conditions and seasonal variation of water treatment equipment design and operating conditions. Biologically, there are many types of anaerobic bacteria exist in wastewater. The activity, type and number of these bacteria depend on the characteristics of the wastewater and weather conditions at the time of collection. This will affect strongly the production of biogas and the efficiency of biodegradation of the organic matter. Since chemical and physical properties for the sewage sludge are variable, this may cause difficulties in linking the results of experiments that are carried out with different sludge batches. Therefore, the present study used samples of the same sludge, which was taken from the same wastewater treatment plant and distributed it to both reactors D1,D2 at the same time with the same operating conditions.

The introduction of nutrients or trace metals into sludge is usually not required because wastewater generally comprises lipids, polysaccharides, protein and nucleic acids which are bio-degraded by anaerobic bacteria to produce biogas and effluent, which used as fertilizer.

For the successful operation of anaerobic digestion, facultative anaerobes, including methanogenic bacteria and organic particulates should be present in the sludge. The primary clarifier in waste treatment provides particulates and many anaerobes including methane-produce bacteria, whilst the secondary clarifier provides many facultative anaerobes. In the present research, the digested sludge was collected from the outlet stream of a full-scale mesosphilic digester from a wastewater treatment plant in Sheffield city, UK. Digested sludge has methanogenesic bacteria but with low concentration of substrates.

3.2 Results and Discussion

Figure 24A:
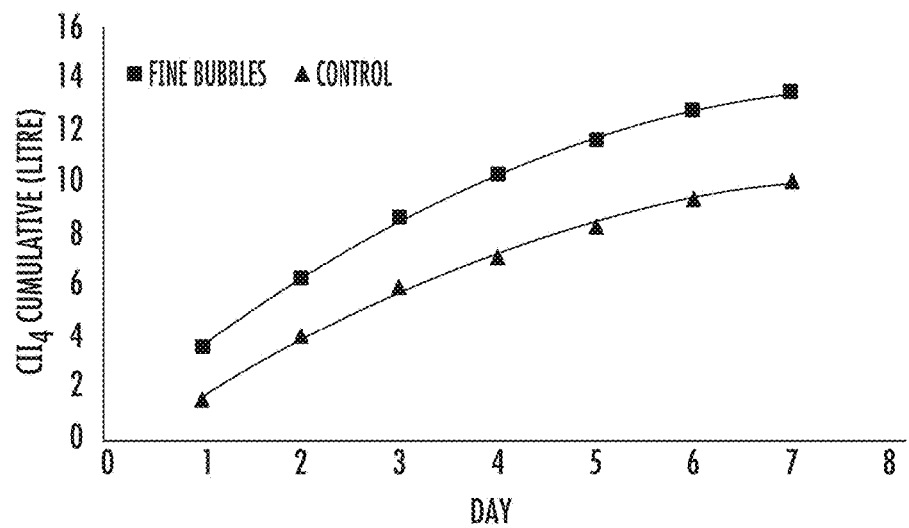
FIGS. 24 a and b are graphs showing (a) methane production from the digesters of FIG. 23 with and without bubble injection, and (b) methane production per day before and after one hour nitrogen sparging in the digester of FIG. 23.
Figure 24B:
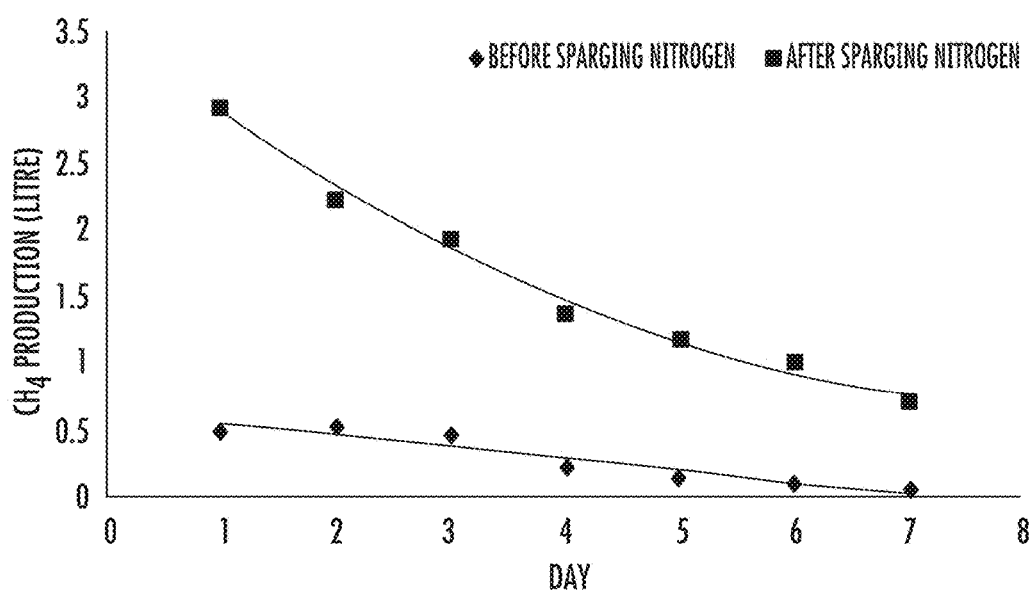

FIG. 24a shows that during 170 hours, the cumulative methane production from the airlift anaerobic digester 280 was about 29% higher than observed in the control anaerobic digester 282. A large amount of methane obtained from the airlift anaerobic digester occurred during the sparging with nitrogen for one hour daily as shown as in the FIG. 24b. This indicates that the biogas produced by the biological process remains unreleased in digested sludge due to characteristics of sludge that prevents biogas rising. Therefore any contact with gas bubbles will strip due to the concentration gradient across them. Poor solubility of methane gas enhances gas stripping from digested sludge.

After sparging, the overall Gibbs free energy becomes more negative, and hence the reaction becomes thermodynamically favourable and moves towards the formation of more products. However, due to the use of digested sludge in this experiment, the substrate composition was minimal and limiting for the methanogenesic bacteria. Thus, during the hydraulic retention time, the production of methane decreased each day as illustrated in the FIG. 24b. That reduction occurred in both digesters.

The essential ingredient in the biological medium is water with a composition of 90-95% depending on the type of bioprocess. For instance, water content in sludge is around 95%, while 5% consists of micro-organisms, organic matters, elements and suspended solids. Micro-organisms feed on the organic matter and elements to produce gases by metabolic processes. Carbon dioxide, methane, and hydrogen are highest composition gases produced from fermentation process. The ability of these gases to stay in the liquid phase is related to their relatively solubility, which is 1.45 g gas/kg water in the case of carbon dioxide, 0.0215 g gas/kg water in the case of methane and 0.00155 g gas/kg water in the case of hydrogen. It can be seen that $CO_2$ is relatively highly soluble compared with $CH_4$ and $H_2$. Thus, it will be stay in the liquid phase longer as dissolved aqueous gas ($CO_{2(aq)}$). Released carbon dioxide reacts with water to produce carbonic acid. Kinetically, the conversion to carbonic acid is very slow, just 0.2% of carbon dioxide converts to carbonic acid and its ions, while 99.8% remains as dissolved gas. Carbonic acid is a diprotic acid, dissociating into bicarbonate and carbonate ions, and producing two hydrogen atoms ionisable in water.

From the above, it can be noted that the presence of dissolved carbon dioxide in the liquid phase will produce a hydrogen ion that would be expected to lead to a lowering of the pH. However the pH observed in the airlift anaerobic digester 280 and the conventional anaerobic digester 282 approximately stabilized during the experimental work, (except that a slight change in the airlift digester was observed during sparging of nitrogen). This means that the carbonic acid produced from dissolved carbon dioxide is treated immediately by ammonia produced from biodegradation of protein. The low solubility of the methane contributes to its transfer from the liquid phase to the gas phase. Most of the carbon dioxide remains in the sludge as "dissolved gas" until a suitable opportunity for it to transfer is provided through the driving force of sparging with nitrogen.

Figure 25A:
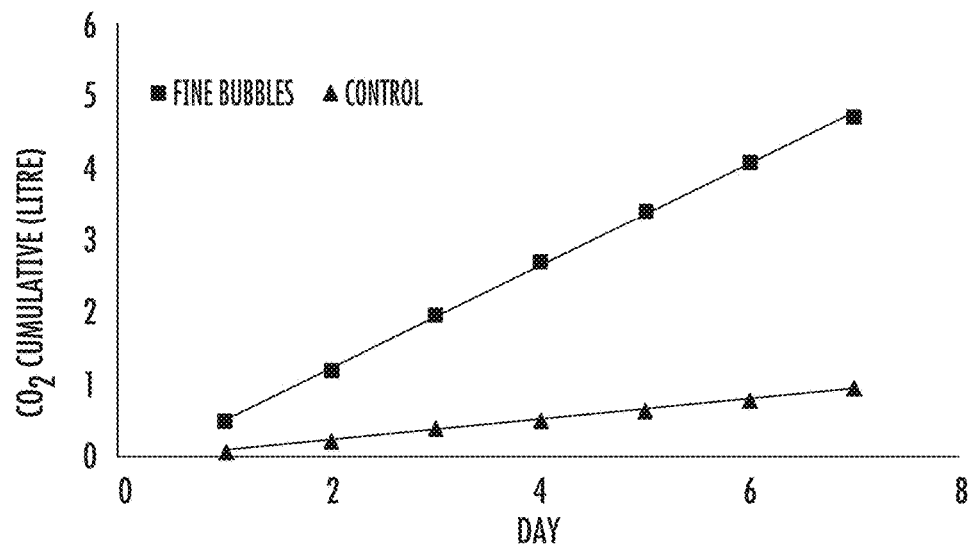
FIGS. 25 a and b are graphs showing (a) carbon dioxide produced from the digester, with and without nitrogen injection, and (b) hydrogen sulphide produced from anaerobic digestion, again with and without nitrogen sparging.

FIG. 25a shows the production of carbon dioxide from the anaerobic digester with and without nitrogen sparging. The figure shows that the bubbling system in anaerobic digestion contributes to increasing the carbon dioxide in biogas production. The efficiency with the bubbling system was 350% more than with the control digester. Experimentally, the complex characteristics of the sludge have played an important role in stripping of all gases.

The same thing happens with $H_2S$. The high solubility of hydrogen sulphide contributes to remaining in the sludge as $H_2S(aq)$. When $H_2S$ dissolves in sludge, the pH, also, would drop due to releasing a hydrogen ion and forming a weak acid. Indeed, the behaviour of the solubility of hydrogen sulphide is very similar to carbon dioxide because both gases form a diprotic acid in water.

Sulphate dissolved with a high concentration, can inhibit generation of biogas produced from the anaerobic digestion of wastewater. The most important reason leading to this inhibition is that the sulphate dissolved in wastewater encourages growth of sulphate-reducing bacteria, which consume acetic acid and hydrogen that would otherwise be consumed by methanogenesic bacteria. This competition between the sulphate-reducing bacteria and the methane-producing bacteria for the consumption of the hydrogen and acetic acid can be illustrated thermodynamically through the equations:

Methanogensis:

$$CO_2 + 4H_2 \rightarrow CH_4 + 2H_2O \quad \Delta G = -135 \text{ kJ} \tag{10}$$

$$CH_3COOH + 4H_2 \rightarrow CH_4 + CO_2 \quad \Delta G = -28.5 \text{ kJ} \tag{11}$$

Sulphate Reduction:

$$SO_4^{2-} + 4H_2 \rightarrow 2H_2O + 2OH^- \quad \Delta G = -154 \text{ kJ} \tag{12}$$

$$SO_4^{2-} + CH_3COOH \rightarrow H_2S + 2HCO_3^- \quad \Delta G = -43 \text{ kJ} \tag{13}$$

From above equations, it can be seen that the sulphate-reduction reactions have greater thermodynamic driving force than methanogenesis. Therefore methane production is inversely related to sulphate concentration. It has also been discovered that $H_2S$ has a negative impact on the methane production bacteria. It is also suggested that the concentration of $H_2S$ can be taken as an indicator of inhibition of methanogenesic bacteria (GERARDI M. H., 2003).

Removal of dissolved $H_2S$ from sludge prevents inhibition of methanogenesic bacteria and is desirable also to reduce odour from digested sludge. Normally, the removal of $CO_2$ and $H_2S$ take place by biogas generated ($CH_4$ and $CO_2$) or by contact with the head space in the top of sludge. But this is insufficient to remove the dissolved gases. Mixing of the digested sludge provides intimate contact between sludge and bubbles of biogas and headspace. However; the characteristics of digested sludge require high energy to make it. Using an airlift digester with low energy requirement helps to remove most of hydrogen sulphide generated.

Figure 25B:
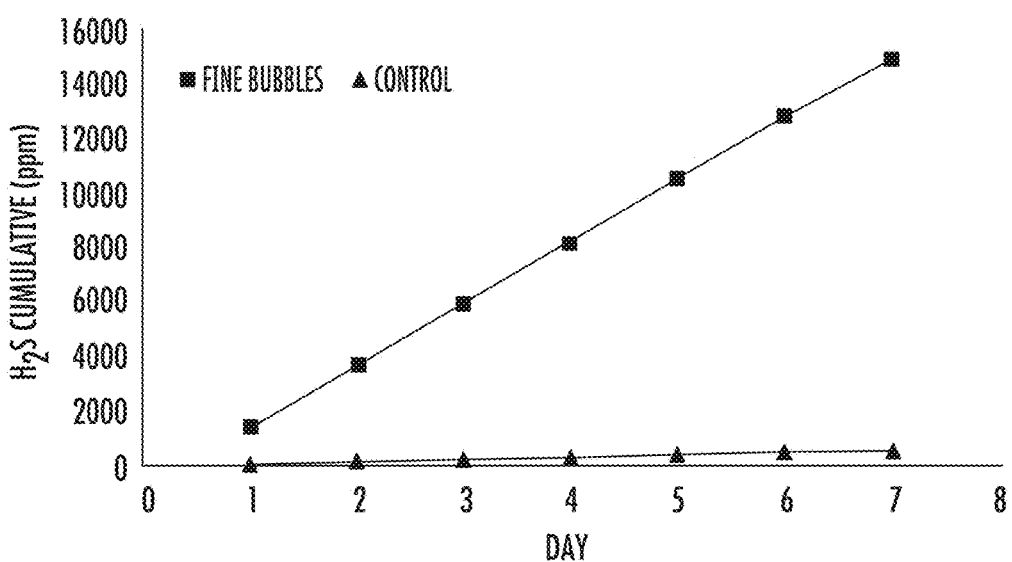

FIG. 25b shows the hydrogen sulphide removal from digested sludge during nitrogen bubbling. The figure indicates that with one hour of nitrogen sparging with fine bubbles, there is a stark increase in the removal of hydrogen sulphide compared to a conventional digester.

The benefits of the airlift bioreactor are illustrated through the above results. Low energy, good mixing, and enhancement of stripping gases are the most important of the characteristics of airlift bioreactor that were utilized in this study. More methane and more stripping of carbon dioxide and hydrogen sulphide were obtained from this utilization.

However, while bubbling nitrogen during the initial, growth and end phases of anaerobic digestion enhance methane production for the reasons explained above, a further development is in recycling biogas produced by the digestion during the growth phase. This appears counterproductive, because biogas has a composition of approximately 60% carbon dioxide and 40% methane, which broadly balances the concentrations in solution. Consequently, bubbles of gas with this constitution do not alter the composition of the digester through chemical imbalance, (where the bubble surface acts as a membrane across which a concentration gradient exists). Nevertheless, it is found that bubbles of biogas increase in size and volume following injection. The reason for this is that methane is "strongly" gaseous at room and warmer temperatures (anaerobic digestion is exothermic and can elevate temperatures of digesters to circa 35° C.). However, methane is also "sticky", with respect to particles and bacteria surfaces, and therefore does not easily escape the liquid phase after its release by the producing bacteria. Collisions with biogas bubbles however provide an opportunity for methane to escape the liquid environment and return to the gas phase and thus enlarge the bubbles cycling through the digester. As a result, the concentration of carbon dioxide, and other gases such as hydrogen sulphide, therefore inevitably also decreases within the bubbles as methane is absorbed. By that means, a concentration gradient is restored across the bubble surface driving more dissolved gases into the bubble. This saves having to employ nitrogen.

In a final development, it is found that pure carbon dioxide can be injected during the growth phase. This also has the counterintuitive effect, not of affecting methane extraction, but of course of adding to the carbon dioxide loading of the digester. However, it is found that the reaction-limiting factor of methanogensis is not a lack of hydrogen in equations (10) and (11) above (and (10) in particular), but firstly the inhibiting effect of retained methane AND a lack of appropriate fuel (carbon dioxide) for the bacteria. The bubbles have therefore also comprised pure carbon dioxide (optionally exhaust carbon dioxide from other processes, for example, the combustion of biogas already produced and used in the generation of electricity). Consequently, in this context "pure" carbon dioxide may well contain impurities. Nevertheless, not only do the bubbles of such gas extract the methane, just as biogas or nitrogen does, but also they provide additional fuel to encourage growth of the methanogenesic bacteria. Consequently, the yield of methane is yet further enhanced.

At the end of the growth phase, it is still preferred to return to nitrogen purging, for the purposes explained above, to both remove vestigial dissolved gases and neutralise the final digestate. The result is a digestate that does not require drying, but instead can be distributed in liquid form without damaging pumps (through cavitation problems) or unprotected pipelines (through corrosive acid attack). Indeed, in appropriate situations, the digestate can be pumped from the digester through pipelines directly to irrigation arrays and ditches on agricultural land for fertilisation purposes. This saves significant energy costs in otherwise drying and transporting digestate by road.

The bubbling of gas into the anaerobic digester may be undertaken once or twice daily over a period of perhaps one hour on each occasion. If the bubbles are small, in the order of 10-30 µm then they have such a slow rise rate in the tank that they will remain in place for up to 24 hours. During that period they are resident in the digester and, if sufficient quantity of bubbles are injected, and the bubbles are small enough, microorganisms throughout the digester can access bubbles to shed themselves of the inhibiting methane.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

REFERENCES

AHMED, N. & JAMESON, G. J. 1985. The effect of bubble size on the rate of flotation of fine particles. *International Journal of Mineral Processing*, 14, 195-215.

AL-SHAMRANI, A. A., JAMES, A. & XIAO, H. 2002a. Destabilisation of oil-water emulsions and separation by dissolved air flotation. *Water Research*, 36, 1503-1512.

AL-SHAMRANI, A. A., JAMES, A. & XIAO, H. 2002b. Separation of oil from water by dissolved air flotation. *Colloids and Surfaces A: Physicochemical and Engineering Aspects*, 209, 15-26.

BOROWITZKA, M. 1992. Algal biotechnology products and processes—matching science and economics. *Journal of Applied Phycology*, 4, 267-279.

CHISTI, Y. 2007. Biodiesel from microalgae. *Biotechnology Advances*, 25, 294-306.

CILLIERS, J. J. & BRADSHAW, D. J. 1996. The flotation of fine pyrite using colloidal gas aphrons. Minerals Engineering, 9, 235-241.

CHOW, C. W. K., HOUSE, J., VELZEBOER, R. M. A., DRIKAS, M., BURCH, M. D. & STEFFENSEN, D. A. 1998. The effect of ferric chloride flocculation on cyanobacterial cells. Water Research, 32, 808-814.

DAI, Z., DUKHIN, S., FORNASIERO, D. & RALSTON, J. 1998. The Inertial Hydrodynamic Interaction of Particles and Rising Bubbles with Mobile Surfaces. *Journal of Colloid and Interface Science*, 197, 275-292.

DAI, Z., FORNASIERO, D. & RALSTON, J. 2000. Particle-bubble collision models—a review. *Advances in Colloid and Interface Science*, 85, 231-256.

DERJAGUIN, B. V. & DUKHIN, S. S. 1993. Theory of flotation of small and medium-size particles. *Progress in Surface Science*, 43, 241-266.

EDZWALD, J. K. 1995. Principles and applications of dissolved air flotation. *Water Science and Technology*, 31, 1-23.

EDZWALD, J. K. 2010. Dissolved air flotation and me. *Water Research*, 44, 2077-2106

EL-KAYAR, A., HUSSEIN, M., ZATOUT, A. A., HOSNY, A. Y. & AMER, A. A. 1993. Removal of oil from stable oil-water emulsion by induced air flotation technique. *Separations Technology*, 3, 25-31.

ENGLERT, A. H., RODRIGUES, R. T. & RUBIO, J. 2009. Dissolved air flotation (DAF) of fine quartz particles using an amine as collector. *International Journal of Mineral Processing*, 90, 27-34.

GERARDI M. H., 2003, Microbiology of anaerobic digestion, John Wiley Interscience.

GOCHIN, R. J. & SOLARI, J. 1983. The role of hydrophobicity in dissolved air flotation. *Water Research*, 17, 651-657.

GRAMMATIKA, M. & ZIMMERMAN, W. B. 2001. Microhydrodynamics of flotation processes in the sea surface layer. Dynamics of Atmospheres and Oceans, 34, 327-348.

GUDIN, C. & THEPENIER, C. 1986. Bioconversion of solar energy into organic chemicals by microalgae. Advances in biotechnological processes, 6, 73-110.

HANLY, G., FORNASIERO, D., RALSTON, J. & SEDEV, R. 2011. Electrostatics and Metal Oxide Wettability. The Journal of Physical Chemistry C, 115, 14914-14921.

HANOTU, J., BANDULASENA, H. C. H., ZIMMERMAN, W. B. 2012. Microflotation performance for algal separation. Biotechnology and Bioengineering. Volume 109, Issue 7, pages 1663-1673, July 2012

HOSNY, A. Y. 1996. Separating oil from oil-water emulsions by electroflotation technique. *Separations Technology*, 6, 9-17.

JIANG, L., KRASOWSKA, M., FORNASIERO, D., KOH, P. & RALSTON, J. 2010. Electrostatic attraction between a hydrophilic solid and a bubble. Physical Chemistry Chemical Physics, 12, 14527-14533.

KITCHENER, J. A. & GOCHIN, R. J. 1981. The mechanism of dissolved air flotation for potable water: basic analysis and a proposal. *Water Research*, 15, 585-590.

LI, X.-B., LIU, J.-T., WANG, Y.-T., WANG, C.-Y. & ZHOU, X.-H. 2007. Separation of Oil from Wastewater by Column Flotation. *Journal of China University of Mining and Technology*, 17, 546-551, 577.

AL-MASHHADANI, M. K. H., WILKINSON, S. J., & ZIMMERMAN W. B. 2012 Removal of Acid-gases from Digested Sludge Using Microbubble Generated by Fluidic Oscillation, The Sixth International Conference on Environmental Science and Technology Jun. 25-29, 2012, Hilton Hotel, Houston, Tex., USA (available at http://eyrie.shef.ac.uk/steelCO2/open/alreadydigested.pdf).

MIETTINEN, T., RALSTON, J. & FORNASIERO, D. 2010. The limits of fine particle flotation. *Minerals Engineering*, 23, 420-437.

MOLINA GRIMA, E., BELARBI, E. H., ACIÉN FERNÁNDEZ, F. G., ROBLES MEDINA, A. & CHISTI, Y. 2003. Recovery of microalgal biomass and metabolites: process options and economics. Biotechnology Advances, 20, 491-515.

NGUYEN, A. V. 1998. Particle-bubble encounter probability with mobile bubble surfaces. *International Journal of Mineral Processing*, 55, 73-86.

PARKINSON, L., SEDEV, R., FORNASIERO, D. & RALSTON, J. 2008. The terminal rise velocity of 10-100 μm diameter bubbles in water. J. Colloid Interface Sci., 322, 168.

PERNITSKY, D. J. & EDZWALD, J. K. 2006. *Selection of alum and polyaluminum coagulants: principles and applications.*

PIENKOS, P. T. & DARZINS, A. 2009. The promise and challenges of microalgal-derived biofuels. Biofuels, Bioproducts and Biorefining, 3, 431-440.

PYKE, B., FORNASIERO, D. & RALSTON, J. 2003. Bubble particle heterocoagulation under turbulent conditions. Journal of Colloid and Interface Science, 265, 141-151.

RALSTON, J., FORNASIERO, D. & HAYES, R. 1999. Bubble-particle attachment and detachment in flotation. *International Journal of Mineral Processing*, 56, 133-164.

REES, A. J., RODMAN, D. J., and ZABEL, T. F. (1979) Water Clarification by Flotation-5, TR 114, Medmenham, UK: Water Research Centre.

SCHULZE, H. J. 1992. Probability of particle attachment on gas bubbles by sliding. *Advances in Colloid and Interface Science*, 40, 283-305.

TEIXEIRA, M. R. & ROSA, M. J. 2006. Comparing dissolved air flotation and conventional sedimentation to remove cyanobacterial cells of *Microcystis aeruginosa* Part 1: The key operating conditions. *Separation and Purification Technology*, 52, 84-94.

TEIXEIRA, M. R., SOUSA, V. & ROSA, M. J. 2010. Investigating dissolved air flotation performance with cyanobacterial cells and filaments. *Water Research*, 44, 3337-3344.

TESAŘ, V. & BANDALUSENA, H. 2011. Bistable diverter valve in microfluidics. *Experiments in Fluids*, 50, 1225-1233.

TESAR, V., HUNG, C.-H. & ZIMMERMAN, W. B. 2006. No-moving-part hybrid-synthetic jet actuator. Sensors and Actuators A: Physical, 125, 159-169.

WATERS, K. E., HADLER, K. & CILLIERS, J. J. 2008. The flotation of fine particles using charged microbubbles. Minerals Engineering, 21, 918-923.

WU, X.-J. & CHAHINE, G. L. 2010. Development of an acoustic instrument for bubble size distribution measurement. *Journal of Hydrodynamics*, Ser. B, 22, 330-336.

WYATT, N. B., GLOE, L. M., BRADY, P. V., HEWSON, J. C., GRILLET, A. M., HANKINS, M. G. & POHL, P. I.

2011. Critical conditions for ferric chloride-induced flocculation of freshwater algae. *Biotechnology and Bioengineering*, n/a-n/a.

YAN, Y.-D. & JAMESON, G. J. 2004. Application of the Jameson Cell technology for algae and phosphorus removal from maturation ponds. *International Journal of Mineral Processing*, 73, 23-28.

ZIMMERMAN, W. B. 2010. Electrochemical microfluidics. *Chemical Engineering Science*, 66, 1412-1425.

ZIMMERMAN, W. B., HEWAKANDAMBY, B. N., TESAR, V., BANDULASENA, H. C. H. & OMOTOWA, O. A. 2009. On the design and simulation of an airlift loop bioreactor with microbubble generation by fluidic oscillation. *Food and Bioproducts Processing*, 87, 215-227.

ZIMMERMAN, W. B., TESAR, V. & BANDULASENA, H. C. H. 2011a. Towards energy efficient nanobubble generation with fluidic oscillation. *Current Opinion in Colloid & Interface Science*, 16(4): 350-356.

ZIMMERMAN, W. B., TESAR, V., BUTLER, S. & BANDULASENA, H.2008. Microbubble Generation. *Recent Patents on Engineering*, 2, 1-8.

ZIMMERMAN, W. B., ZANDI, M., HEMAKA BANDULASENA, H. C., TESAR, V., JAMES GILMOUR, D. & YING, K. 2011b. Design of an airlift loop bioreactor and pilot scales studies with fluidic oscillator induced microbubbles for growth of a microalgae *Dunaliella salina. Applied Energy*, 88, 3357-3369.

ZOUBOULIS, A. I. & AVRANAS, A. 2000. Treatment of oil-in-water emulsions by coagulation and dissolved-air flotation. *Colloids and Surfaces A: Physicochemical and Engineering Aspects*, 172, 153-161.

The invention claimed is:

1. An anaerobic digester comprising:
   a liquid fermenter tank for anaerobic microorganisms; and
   a diffuser of a microbubble generator to introduce microbubbles of non-oxygen containing gas into liquid in the anaerobic digester so as to induce non-turbulent laminar flow of the liquid,
   wherein:
   the anaerobic digester is configured as an airlift bioreactor;
   methane and acid gases produced by the anaerobic digester are exchanged across a surface of the microbubbles to strip the methane and acid gases from the liquid when said microbubbles connect with a header space of the liquid fermenter tank; and
   the microbubbles of non-oxygen containing gas are generated at the diffuser with a fluidic oscillator.

2. The anaerobic digester of claim 1, wherein, at a commencement phase of said digestion, said gas contained in the microbubbles is nitrogen or another inert gas that strips the fermenter of oxygen to promote the onset of anaerobic digestion.

3. The anaerobic digester of claim 1, wherein during a growth phase of the microorganisms in the digester, said gas contained in the microbubbles comprises a biogas generated and released into the head space of the fermenter tank.

4. The anaerobic digester of claim 1, wherein the gas contained in the microbubbles comprises approximately 60% methane and 40% carbon dioxide.

5. The anaerobic digester of claim 1, wherein, during a growth phase of digester, said gas contained in the microbubbles comprises more than 90% carbon dioxide.

6. The anaerobic digester of claim 1, wherein, at an endphase of said digestion, said gas contained in the microbubbles is nitrogen or another inert gas that serves to strip methane and hydrogen sulphide from the fermenter to neutralize an acidity of remaining liquid in the anaerobic digester.

7. The anaerobic digester of claim 1, wherein the gas contained in the microbubbles comprises carbon dioxide, and the carbon dioxide is sourced from one of: power production from combustion of the methane produced and sequestered carbon dioxide from other sources.

8. The anaerobic digester of claim 1, wherein the bubbles have a diameter in the range 10 to 100 μm.

9. The anaerobic digester of claim 1, wherein at least a proportion of the bubbles have a diameter in the range 10 to 30 μm accounting for at least a gas holdup of 0.05%.

10. The anaerobic digester of claim 1, wherein at least a proportion of the bubbles have a diameter in the range 10 to 30 μm accounting for at least a gas holdup of 0.5%.

11. The anaerobic digester of claim 1, wherein:
    the tank has sides and a base and the liquid in the tank has a top surface above which is the header space; and
    the diffuser is disposed in the liquid at the base of the tank and is arranged to inject microbubbles of gas into the liquid in the tank whereby the apparent density of the liquid above the diffuser is reduced by the microbubbles thereby creating a flow of the liquid,
    which flow is:
        up the tank in a riser section thereof,
        turned sideways at the surface of the liquid, where at least a proportion of the microbubbles either break at the surface, terminate passage through the liquid at the surface, or are reduced in diameter through dissolution of the gas in the microbubbles into the liquid during their passage up the riser section;
        turned down at the sides of the tank into a downcomer section of the tank;
        turned sideways back into the riser section; and
        at least in the riser section, is non-turbulent laminar flow having a Reynolds number less than 2000, the Reynolds number being based on the liquid flow velocity, its constitutive properties, and the pore diameter of the diffuser.

* * * * *